(12) United States Patent
Yamada et al.

(10) Patent No.: US 6,545,696 B1
(45) Date of Patent: Apr. 8, 2003

(54) OPTICAL PRINTING APPARATUS

(75) Inventors: Keiki Yamada, Tokyo (JP); Ichiro Furuki, Tokyo (JP); Hiroshi Ito, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/556,800

(22) Filed: Apr. 25, 2000

(30) Foreign Application Priority Data

Apr. 27, 1999 (JP) ........................................... 11-119775
Feb. 17, 2000 (JP) ....................................... 2000-040070

(51) Int. Cl.$^7$ ................................................. B41J 2/47
(52) U.S. Cl. ....................................... 347/240; 347/251
(58) Field of Search ................................ 347/183, 184, 347/237, 240, 247, 251, 188, 194; 345/82, 84; 358/456, 458, 461

(56) References Cited

U.S. PATENT DOCUMENTS

| | | | |
|---|---|---|---|
| 4,651,176 A | | 3/1987 | Yamakawa et al. .......... 347/130 |
| 4,688,051 A | * | 8/1987 | Kawakami et al. ......... 347/184 |
| 4,939,529 A | * | 7/1990 | Kanayama et al. ......... 347/237 |
| 4,962,375 A | * | 10/1990 | Hirane et al. .................. 345/82 |
| 4,975,786 A | * | 12/1990 | Katayama et al. ........... 358/456 |
| 5,440,684 A | * | 8/1995 | Tack et al. ................... 347/188 |
| 5,812,176 A | * | 9/1998 | Kawabe et al. .............. 347/240 |
| 5,874,982 A | * | 2/1999 | Ueda et al. .................. 347/194 |

FOREIGN PATENT DOCUMENTS

| JP | A62134629 | | 6/1987 | |
|---|---|---|---|---|
| JP | 9-277598 A | * | 10/1997 | ............ B41J/2/445 |

* cited by examiner

*Primary Examiner*—Hai Pham
(74) *Attorney, Agent, or Firm*—Birch, Stewart, Kolasch, & Birch, LLP

(57) ABSTRACT

In an optical printing apparatus with employment of a low-cost arrangement, a high image quality recording operation is realized. The optical printing apparatus is arranged by including: image data input device for inputting image data; image data correcting device for correcting the inputted image data in such a manner that a density fluctuation is deleted in correspondence with elements of a print head; reference level producing device for producing a reference level; comparing device for comparing multi-value data outputted from the image data correcting device with the reference level so as to convert the multi-value data into binary data; data transferring device for transferring the binary data outputted from the comparing device as head data to the print head; latch control device for latching data of the print data; and strobe control device for enabling the print head to expose the light therefrom; whereby the print head is driven in response to the output results of the data transferring device, the latch control device, and the strobe control device to thereby form the gradation image. As a result, this optical printing apparatus is capable of forming an image with uniform density in low cost, and furthermore, can correct fluctuations of the elements of the print head in high precision.

17 Claims, 27 Drawing Sheets

| INPUT TO ACCUMULATED DRIVE TIME STORAGE MEANS 14 | (CORRESPONDING TO DRIVE TIME) | STROBE WIDTH OF FIRST− GRADATION DATA |
|---|---|---|
| 0~100 | 0~100 HOURS | 50 μS |
| 100~200 | 100~200 | 50 μS |
| ⎞⎠ | ⎞⎠ | ⎞⎠ |
| 500~600 | 500~600 | 55 μS |
| ⎞⎠ | ⎞⎠ | ⎞⎠ |
| 900~1000 | 900~1000 | 75 μS |

FIG. 4

| POSITIONAL INFORMATION | FLUCTUATION DATA |
|---|---|
| 1 | 16 |
| 2 | 3 |
| 3 | 7 |
| ⋮ | ⋮ |
| 638 | 1 |
| 639 | 9 |
| 640 | 9 |

FIG. 5

| | | GROUP NUMBER | | | | | | | |
|---|---|---|---|---|---|---|---|---|---|
| | | 1 | 2 | 3 | ...... | 9 | ....... | 14 | 15 | 16 |
| IMAGE DATA | 0 | 0 | 0 | 0 | ...... | 0 | ....... | 0 | 0 | 0 |
| | 1 | 1 | 1 | 1 | ...... | 1 | ....... | 1 | 1 | 1 |
| | 2 | 1 | 1 | 1 | ...... | 2 | ....... | 2 | 3 | 3 |
| | 3 | 2 | 2 | 2 | ...... | 3 | ....... | 4 | 4 | 4 |
| | ⋮ | ⋮ | ⋮ | ⋮ | | ⋮ | | ⋮ | ⋮ | ⋮ |
| | 128 | 77 | 83 | 89 | ...... | 128 | ....... | 160 | 166 | 172 |
| | ⋮ | ⋮ | ⋮ | ⋮ | | ⋮ | | ⋮ | ⋮ | ⋮ |
| | 253 | 151 | 164 | 177 | ...... | 253 | ....... | 255 | 255 | 255 |
| | 254 | 152 | 165 | 178 | ...... | 254 | ....... | 255 | 255 | 255 |
| | 255 | 153 | 167 | 179 | ...... | 255 | ....... | 255 | 255 | 255 |

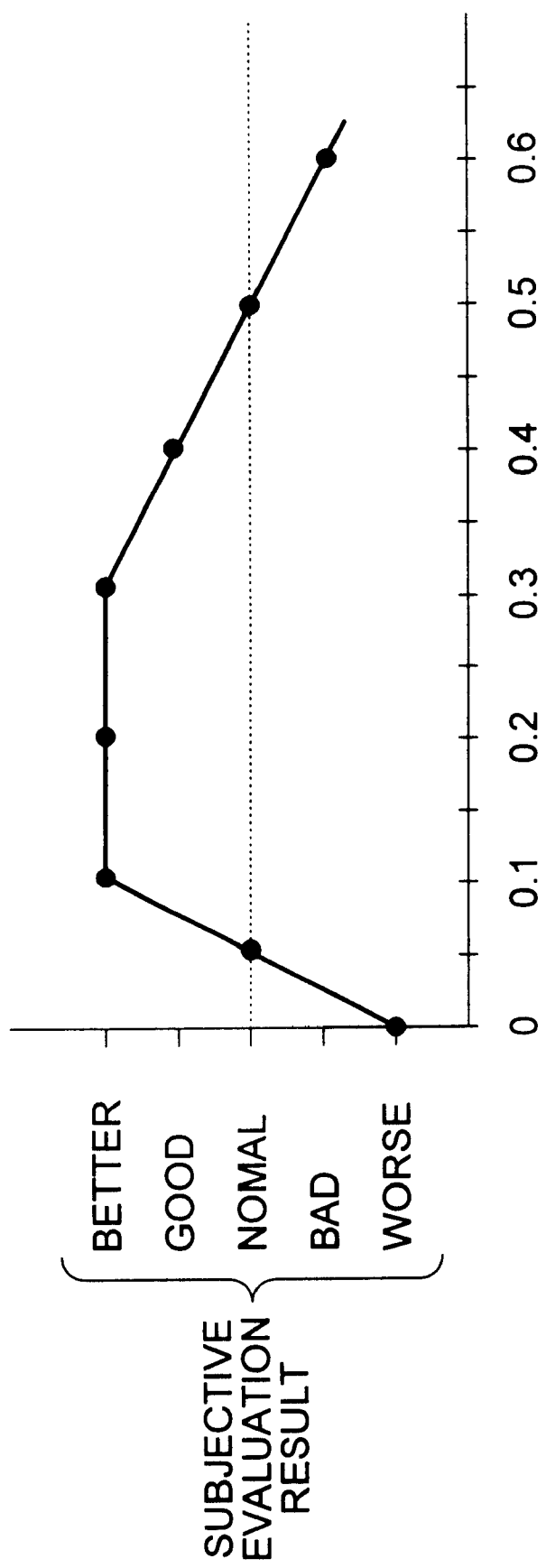

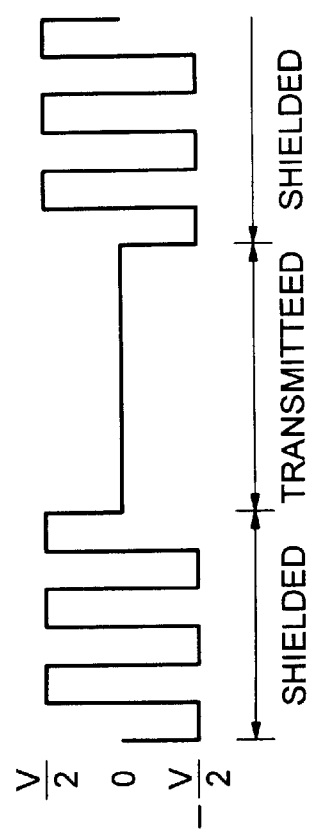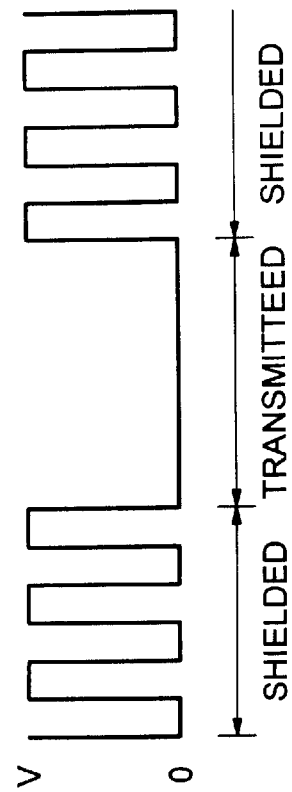

| IMAGE DATA | EXPOSURE LEVEL |
|---|---|
| 0 | 0 |
| 1 | 50 |
| 2 | 53 |
| 3 | 54 |
| ⋮ | ⋮ |
| 128 | 180 |
| ⋮ | ⋮ |
| 254 | 290 |
| 255 | 292 |

FIG. 22

| TEMPERATURE | EXPOSURE TIME OF OFFSET |
|---|---|
| ~5°C | 480 μs |
| 6~8 | 460 μs |
| 8~10 | 450 μs |
| ⋮ | ⋮ |
| 22~24 | 300 μs |
| 24~26 | 302 μs |
| ⋮ | ⋮ |
| 60~ | 200 μs |

FIG. 25

| OUTPUT FROM REFERENCE LEVEL PRODUCTING MEANS | STROBE WIDTH |
|---|---|
| 1 | 50 μs |
| 2 | 3 μs |
| 3 | 2 μs |
| ⋮ | ⋮ |
| 128 | 1 μs |
| ⋮ | ⋮ |
| 255 | 2 μs |

FIG. 26

| TEMPERATURE INFORMATION | STROBE WIDTH OF FIRST-GRADATION DATA |
|---|---|
| ~5°C | 80 μs |
| 6~8°C | 78 μs |
| ⋮ | ⋮ |
| 22~24°C | 50 μs |
| ⋮ | ⋮ |
| 60°C~ | 30 μs |

| INPUT TO ACCUMULATED DRIVE TIME STORAGE MEANS 14 | (CORRESPONDING TO DRIVE TIME) | STROBE WIDTH OF FIRST-GRADATION DATA |
|---|---|---|
| 0~100 | 0~100 HOURS | 50 μS |
| 100~200 | 100~200 | 50 μS |
| ⌇ | ⌇ | ⌇ |
| 500~600 | 500~600 | 55 μS |
| ⌇ | ⌇ | ⌇ |
| 900~1000 | 900~1000 | 75 μS |

| EXPOSURE POSITION | FLUCTUATION DATA |
|---|---|
| 1 | 1 |
| 2 | 1 |
| 3 | 1 |
| ∼ | ∼ |
| 160 | 4 |
| ∼ | ∼ |
| 320 | 9 |
| ∼ | ∼ |
| 640 | 16 |

| | | GROUP NUMBER | | | | | | | |
|---|---|---|---|---|---|---|---|---|---|
| | | 1 | 2 | 3 | ...... | 9 | ...... | 14 | 15 | 16 |
| IMAGE DATA | 0 | 0 | 0 | 0 | ...... | 0 | ...... | 0 | 0 | 0 |
| | 1 | 1 | 1 | 1 | ...... | 2 | ...... | 4 | 4 | 4 |
| | 2 | 2 | 2 | 2 | ...... | 3 | ...... | 6 | 6 | 6 |
| | 3 | 3 | 3 | 3 | ...... | 4 | | 8 | 8 | 8 |
| | ⋮ | ⋮ | ⋮ | ⋮ | | ⋮ | | ⋮ | ⋮ | ⋮ |
| | 128 | 128 | 128 | 129 | ...... | 140 | ...... | 159 | 159 | 160 |
| | ⋮ | ⋮ | ⋮ | ⋮ | | ⋮ | | ⋮ | ⋮ | ⋮ |
| | 253 | 253 | 254 | 255 | ...... | 280 | ...... | 318 | 319 | 320 |
| | 254 | 254 | 255 | 256 | ...... | 281 | ...... | 319 | 320 | 321 |
| | 255 | 255 | 256 | 257 | ...... | 282 | ...... | 320 | 321 | 323 |

OPTICAL PRINTING APPARATUS

BACKGROUND OF THE INVENTION

1. Field of the Invention

The present invention generally relates to an optical printing apparatus for exposing light onto a photosensitive recording medium to form a gradation image. More specifically, the present invention is directed to such an optical printing apparatus. That is, while one column, or plurality of columns constituted by a large number of light emitting elements (e.g., LEDs and ELs), or switching elements (e.g., liquid crystal shutter elements) are arranged as a print head, the respective elements are independently controlled in response to image data so as to print out a gradation image in the optical printing apparatus.

2. Description of the Related Art

Various sorts of optical printing apparatuses have been developed as apparatuses employing instant films and simultaneous color paper, and are commercially available in the markets. In these optical printing apparatuses, light is exposed onto photosensitive recording media so as to form gradation images.

A conventional optical printing apparatus will now be explained with reference to a drawing. FIG. 36 is a perspective view for schematically indicating a structure of a print head used in one conventional optical printing apparatus as disclosed in, for instance, Japanese Patent Application Laid-open No. 7-256928.

In FIG. 36, white light emitted from a halogen point light source 100 is separated into red-colored light, green-colored light, and blue-colored light by way of a color liquid crystal (LCD) shutter 101. The R, G, B-colored light is continuously irradiated onto an edge surface of an acrylic rod 102 in a time shift manner. In this print head, the acrylic rod 102 is covered with a reflection foil on which aluminum and the like are vapor-deposited except for a light emitting plane thereof. Thus, this acrylic rod 102 owns such a function capable of effectively converting light entered from a rod edge surface into line-shaped light. As a result, the red line-shaped light, the green line-shaped light, and the blue line-shaped light are continuously irradiated onto a black/white shutter array 103 in a time shift manner.

In this case, 3 columns of pixel arrays corresponding to the red light, the green light, and the blue light are provided inside the black/white shutter array 103. These pixel arrays are driven in such a manner that only designated color light can pass therethrough. For example, when the red line-shaped light is irradiated, this red line-shaped light can pass through only one pixel array corresponding to the color light, whereas the other two pixel arrays are kept under shield condition. Then, the red line-shaped light, the green-shaped light, and the blue line-shaped light, which are modulated by the black/white shutter 103 are focused on a photosensitive paper 105 such as the spectra instant film manufactured by Polaroid Inc., by using a SELFOC lens array 104 (namely, tradename of converging lens array). At this time, since the photosensitive paper 105 is relatively transported with respect to the black/white LCD shutter array 103, the red line-shaped light, the green line-shaped light, and the blue line-shaped light are sequentially exposed onto the same place on the photosensitive paper 105. As a result, a two-dimensional print image can be obtained.

Generally speaking, in the conventional optical printing apparatus, light is exposed onto the photosensitive recording medium to form the gradation image in the above-described manner. To realize short printing time periods, super twisted nematic type liquid crystal, or ferroelectric liquid crystal is employed as the above-explained two different types of liquid crystal shutters (namely, color LCD shutter 101 and black/white LCD shutter 103). These liquid crystal shutters may respond to input image data in high speeds in the unit of millisecond by applying thereto an AC voltage having a frequency of approximately 10 KHz.

On the other hand, in the optical printing apparatus described in Japanese Patent Application Laid-open No. 62-134629, while the light measuring unit for measuring the light amount of the liquid crystal shutter is provided, even when the aging change occurs in the light source unit of the print head, the correction is carried out in such a manner that the variation in density can be reduced. Concretely speaking, first of all, the transmission light amounts of the respective color light in such a case that the liquid crystal shutter is brought into transparent conditions for a constant time period are measured by the photoelectric converting type light receiving unit. The measured light amount data is integrated, and the integrated data is A/D-converted. Subsequently, the image data is converted into the voltage application stop time of the LCD shutter by using the lookup table, and then, the voltage application stop time is corrected in response to the respective color light.

Also, another method is disclosed by which the variation contained in the density can be avoided in response to the information detected by the humidity and/or temperature detecting means.

The above-described conventional optical printing apparatuses own such a problem that the high image quality recording operation cannot be realized in low cost.

In other words, since these conventional optical printing apparatuses are arranged by employing the complex light receiving units, these printing apparatuses become high cost. Furthermore, the density variations caused by the difference in the exposure positions along the main scanning direction when the light source is positioned can hardly be corrected in high precision.

SUMMARY OF THE INVENTION

The present invention has been made to solve the above-explained problem, and therefore, has an object thereof to provide a low-cost optical printing apparatus capable of forming an image with uniform density.

Also, the present invention has another object thereof to provide a low-cost optical printing apparatus with a superior expanding characteristic, capable of highly precisely correcting input image data so as to avoid adverse influences caused by fluctuations of liquid crystal shutter elements and temperatures.

To achieved the above-described objects, an optical printing apparatus, according to a first aspect of the present invention, is featured by such an optical printing apparatus for selectively exposing light emitted from a print head onto a photosensitive recording medium to thereby form a gradation image, comprising: image data input means for inputting image data; image data correcting means for correcting the inputted image data in such a manner that a density fluctuation of the print head is deleted; reference level producing means for producing a reference level; comparing means for comparing multi-value data outputted from the image data correcting means with the reference level so as to convert the multi-value data into binary data; data transferring means for transferring the binary data outputted from the comparing means as head data to the print head; latch control means for latching data of the print data; and strobe control means capable of causing the print head to expose the light therefrom; whereby the print head is driven in response to the output results of the data transferring means, the latch control means, and the strobe control means to thereby form the gradation image.

Also, an optical printing apparatus, according to a second aspect of the present invention, is featured by that the latch control means outputs a latch signal, the intervals of which are substantially equal to constant within a recording time period of 1 line.

Also, an optical printing apparatus, according to a fourth aspect of the present invention, is featured by that the latch control means outputs a latch signal whose interval ratio is substantially equal to 1:2:4:8, - - - , within a recording time period of 1 line.

Also, an optical printing apparatus, according to a sixth aspect of the present invention, is featured by that the strobe control means outputs a strobe signal having a strobe width fitted to a recording characteristic.

Also, an optical printing apparatus, according to third, fifth, and seventh aspects of the present invention, is featured by that the intervals of the latch signal, or the strobe width of the strobe signal is controlled based upon temperature detection information.

Also, an optical printing apparatus, according to an eighth aspect of the present invention, is featured by that the optical printing apparatus is further comprised of; accumulated drive time storage means for storing drive time of the print head in an accumulation manner; and a density variation of the print head is corrected based on accumulated drive time.

Also, an optical printing apparatus, according to a ninth aspect of the present invention, is featured by that the image data correcting means corrects a density variation of the print head, which is caused by a difference in exposure positions along a main scanning direction.

Also, an optical printing apparatus, according to a tenth aspect of the present invention, is featured by that the image data correcting means outputs output data larger than a dynamic range of input data.

Also, an optical printing apparatus, according to an eleventh aspect of the present invention, is featured by such an optical printing apparatus for selectively exposing light emitted from a print head onto a photosensitive recording medium to thereby form a gradation image, comprising: image data input means for inputting image data; image data correcting means for correcting the inputted image data in such a manner that a density fluctuation of the print head is deleted; data transferring means for transferring the data outputted from the image correcting means as head data to the print head; and head data comparing means for comparing the head data in the print head; whereby the print head is driven in response to the output results of the data transferring means and the head data comparing means to thereby form the image.

Also, an optical printing apparatus, according to twelfth and thirteenth aspects of the present invention, is featured by that the fluctuation data of the image data correcting means is contained in the print head.

BRIEF DESCRIPTION OF THE DRAWINGS

A better understanding of the present invention may be made by reading a detailed description in conjunction with the accompanying drawings:

FIG. 4 illustratively shows a table structural example of a fluctuation data storage means of the image data correcting means employed in the optical printing apparatus according to the embodiment mode 1 of the present invention;

FIG. 5 illustratively shows a table structural example of a data converting means of the image data correcting means employed in the optical printing apparatus according to the embodiment mode 1 of the present invention;

FIG. 16 is a graphic diagram for representing a characteristic of the print head functioning as the modification shown in FIG. 15;

FIG. 17 graphically indicates a modified drive method for the print head employed in the optical printing apparatus according to the embodiment mode 1 of the present invention;

FIG. 22 is a table for explaining such an example that environmental temperatures are applied to the modified drive method for the print head shown in FIG. 21;

FIG. 25 is a table for indicating the drive method of the print head employed in the optical print apparatus according to the embodiment mode 4 of the present invention;

FIG. 26 is a table for showing a modified drive method of the print head employed in the optical print apparatus according to the embodiment mode 4 of the present invention;

DETAILED DESCRIPTION OF THE PREFERRED EMBODIMENTS

Embodiment Mode 1

Figure 1:
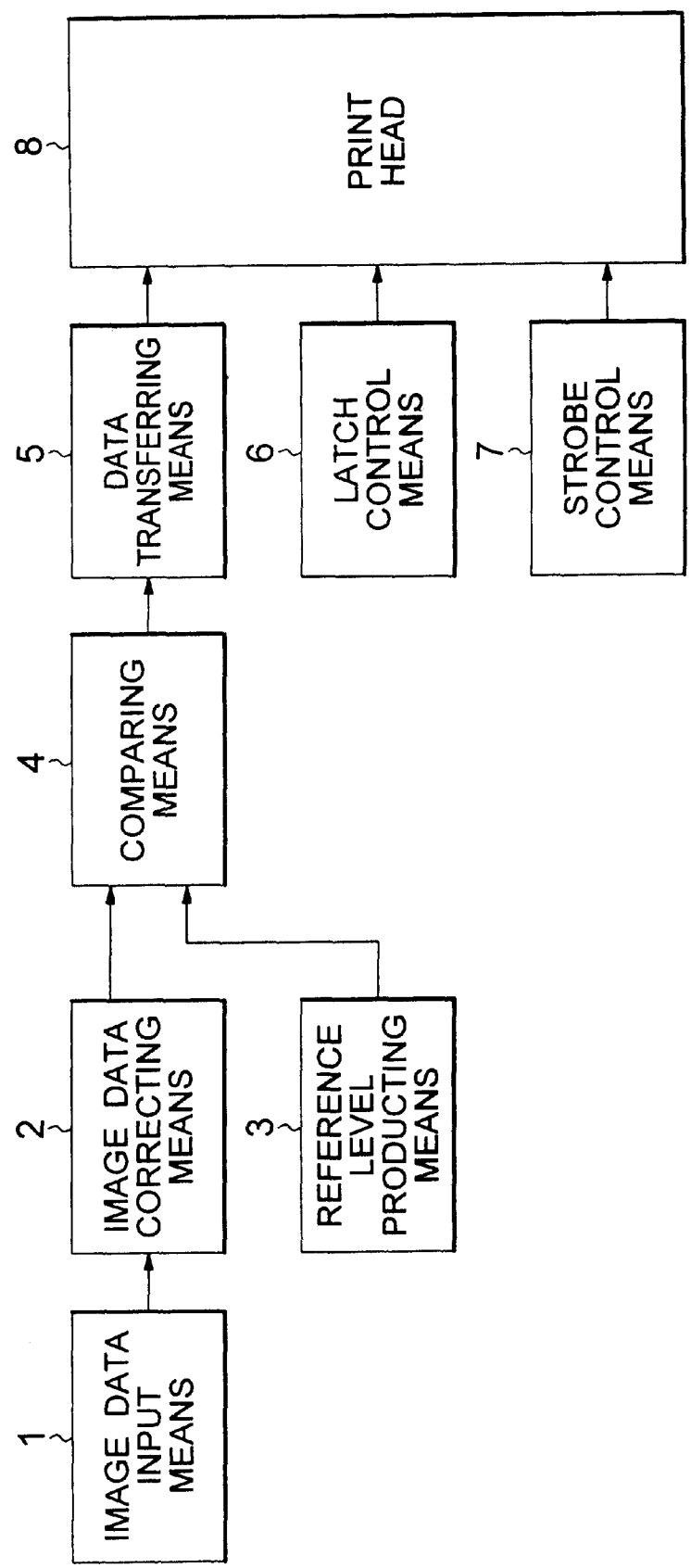
FIG. 1 is a schematic block diagram for showing an arrangement of an optical printing apparatus according to an embodiment mode 1 of the present invention.

Referring now to drawings, an optical printing apparatus according to an embodiment mode 1 of the present invention will be described. FIG. 1 is a schematic block diagram for indicating an arrangement of an optical printing apparatus according to this embodiment mode 1 of the present invention. It should be noted that the same reference numerals shown in the respective drawings indicate the same, or similar structural elements.

In FIG. 1, reference numeral 1 indicates image data input means for inputting image data. For example, image data is entered from such an external host computer (9) as gradation data via this image data input means 1 into this optical printing apparatus. As the gradation data, when 256-gradation data is selected, values defined from 0 to 255 are entered; when 64-gradation data is selected, values defined from 0 to 63 are inputted; and when n-gradation data is selected, values defined from "0" to "n−1" are entered. Symbol "n" is equal to an integer larger than, or equal to 2. In this case, as a physical interface, the existing parallel interface regulated by U.S. Centronics Data Computer Inc, the serial interface such as RS232C, wired interfaces such as IEEE1394 and USB (Universal Serial Bus), and wireless interfaces such as infrared communications are utilized. It should also be understood that various sorts of data (pixel numbers, image data, etc) are transmitted/received between the own optical printing apparatus and the above-explained external host computer (9) under control of control means (not shown) in a desirable sequence. For instance, the reception of the image data is controlled together with commands by the control unit, e.g., either in the unit of 1 line or in the unit of 1 image.

In this drawing, reference numeral 2 shows image data correcting means for correcting image data, namely for correcting fluctuations contained in a liquid crystal (LCD) shutter element (will be described hereinafter).

Figure 2:
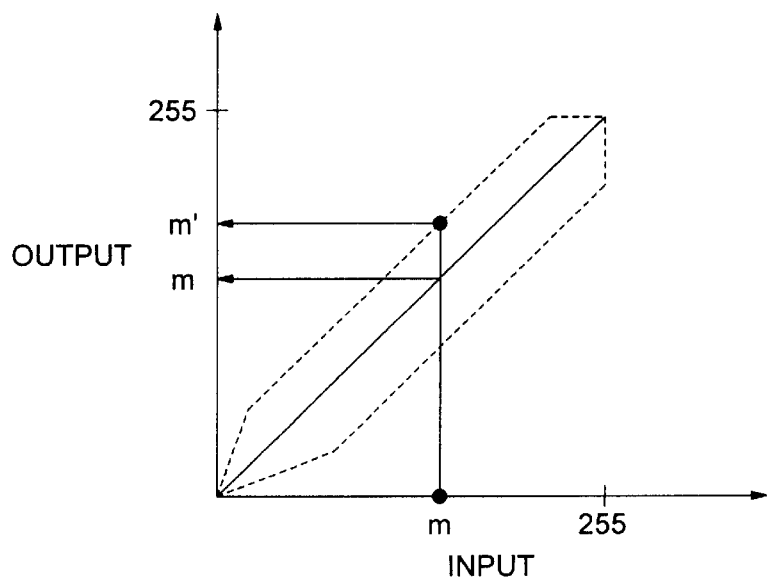
FIG. 2 is a graphic diagram for representing correcting conditions of image data correcting means employed in the optical printing apparatus according to the embodiment mode 1 of the present invention.

FIG. 2 graphically represents correction conditions of the image data correcting means 2, namely such a condition that the input data of the image data correcting means 2 is converted into output data in response to the fluctuations of the liquid crystal shutter element. In FIG. 2, an abscissa indicates input data entered to the image data correcting means 2, and an ordinate shows output data outputted from this image data correcting means 2. An area surrounded by a dotted line constitutes a convertible area. For instance, when a liquid crystal shutter element contains no fluctuation, input data "m" is directly outputted as output data from the image data correcting means 2. When a liquid crystal shutter element contains such a fluctuation, this input data "m" is outputted in response to a magnitude of this fluctuation. For example, when this fluctuation becomes maximum, "m'" is outputted as the output data.

It should be understood that a very important aspect of this embodiment mode 1 is given as follows. That is, the image data correcting means 2 enters thereinto image data, and then does not directly converts this image data into head driving data such as exposure time, but once converts the entered image data into corrected image data. This reason is given as follows. That is, generally speaking, as the subject to be corrected, there are various sorts of subjects, for instance, fluctuations of elements, temperatures, humidities, and a total number of elements which are driven at the same time. The data conversions (namely, all subjects are converted from image data into head driving data) require very cumbersome operations. Also, when conversion tables are formed, lengthy time is necessarily required. Furthermore, since relative relationships among these subjects and converted data become complex, a large number of tables must be saved.

As a consequence, in accordance with this embodiment mode 1, the image data is separated into two systems, so that the optical printing apparatus of this embodiment mode 1 may be expandable and also be made simple and at a low cost. The two systems are constituted by a system for converting the image data into the corrected image data, and another system for converting the correct image data into head driving data such as exposure time. For instance, in the former-mentioned system, subject data such as the fluctuation of the liquid crystal shutter element should be converted in the element level. In the later-mentioned system, subject data such as elements without adverse influences caused by environmental temperatures are all to be controlled at the same time, for example. When such system arrangement is employed, a total table amount can be reduced, and the time required to form the tables can be shortened, and furthermore, the optical printing apparatus can be made in low cost.

Figure 3:
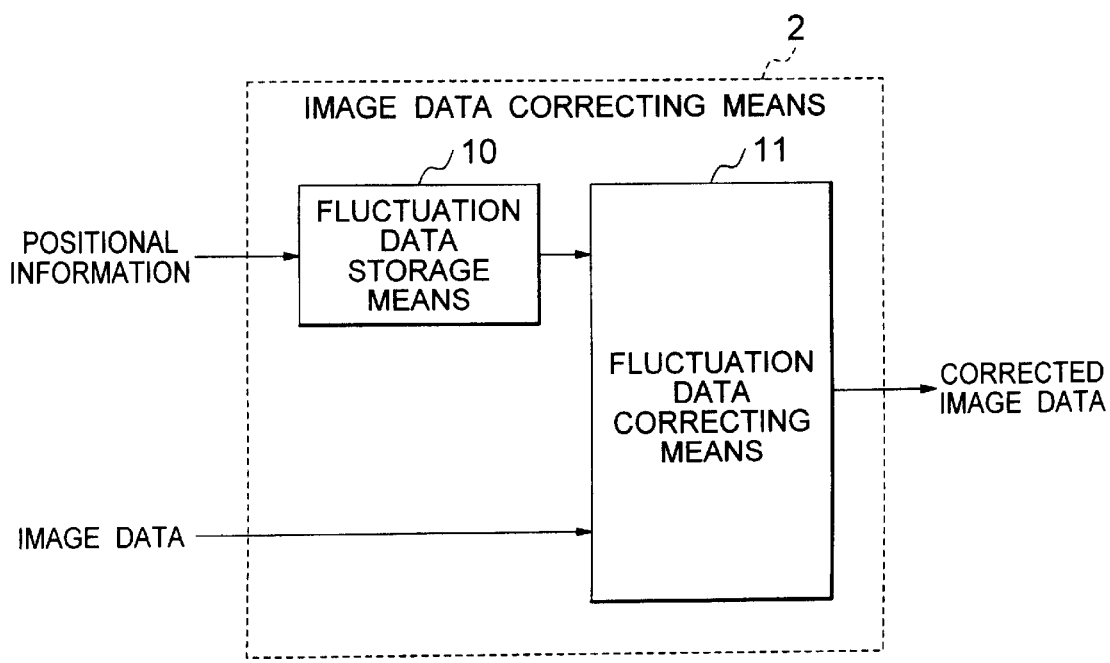
FIG. 3 is a schematic block diagram for indicating the arrangement of the image data correcting means employed in the optical printing apparatus according to the embodiment mode 1 of the present invention.

A structural example of the image data correcting means 2 is indicated in FIG. 3. In FIG. 3, reference numeral 10 shows fluctuation data storage means, and reference numeral 11 indicates fluctuation data converting means.

Normally, when image data is recorded by employing a print head containing a plurality of elements, density fluctuations occur along a main scanning direction. There are many major reasons that causes the density fluctuations, for instance, transmittance, response characteristic, aperture efficiency with respect to the elements for constituting the print head. Assuming now that recording density on a photosensitive recording medium corresponding to each of these elements is equal to the "Di (symbol "i" being total number of elements)", average density "Dm" may be expressed by the following formula (1). Note that i=1 to i:

$$Dm=(\Sigma Di)/i \qquad (1)$$

As a result, a fluctuation error "Ei" of each element may be expressed by the following formula (2):

$$Ei=Di/Dm \qquad (2)$$

In this case, since the fluctuation errors "Ei" become "i" pieces in maximum, these fluctuation errors "Ei" are classified into the below-mentioned groups, for instance, setting each with a 0.05 width, while considering the table capacity and the like:

| | |
|---|---|
| Ei ≦ 0.625 | ... group number 1 |
| 0.625 < Ei ≦ 0.675 | ... group number 2 |
| . | |
| . | |
| . | |
| 0.975 < Ei ≦ 1.025 | ... group number 9 |
| . | |
| . | |
| . | |
| 1.325 < Ei | ... group number 16 |

The above-explained group numbers defined in response to the fluctuations of the respective elements are stored into the fluctuation data storage means 10 in the order corresponding to the respective elements of the print head. In this case, the fluctuation data storage means 10 may be constituted by a ROM (read-only memory), or a RAM (random access memory). In the case that a total element number of this print head is equal to 640, fluctuation data are previously stored as indicated in a structural example of the table shown in FIG. 4. In other words, the fluctuation data storage means 10 is arranged in such a manner that the fluctuation data (group number) can be sequentially outputted in response to inputs of positional information from a control means (not shown).

Both the above-described group number and image data are entered into the fluctuation data converting means 11. This fluctuation data converting means 11 corrects the entered image data to convert the corrected image data into proper image data. Concretely speaking, this fluctuation data converting means 11 calculates a correction coefficient "K" for every gradation data based upon the below-mentioned formula (3) in such a manner that the recording density corresponding to the respective elements becomes equal to each other:

$$K=1/Ei \qquad (3)$$

Furthermore, in the fluctuation data converting means 11, the data conversion is carried out based upon the following formula (4):

$$Dout=f(k)*Din \qquad (4)$$

In this formula, symbol "Dout" indicates image data which has been corrected. Symbol "f(K)" shows a correction coefficient every gradation data. Symbol "Din" represents input image data. Similarly, the fluctuation data converting means 11 is constituted by such a storage means as a ROM and a RAM, or a calculation executed in a control circuit (not shown), and an exclusively-used calculation circuit.

FIG. 5 schematically shows a structural example of the fluctuation data converting means 11 in such a case that the image data is 256-gradation data. In this fluctuation data converting means 11, proper data is outputted from both the image data and the group number corresponding to the data outputted from the fluctuation data storage means 10.

For instance, when the image data corresponding to the first element is "128", a value of "172" is outputted, whereas when the image data corresponding to the second element is "255", a value of "179" is outputted based upon the structural examples of FIG. 4 and FIG. 5. In FIG. 5, it should be noted that the reason why the output value of the smaller group number (namely, thinner than average density) is small is given by considering the characteristic of the photosensitive recording medium. That is, when the exposure time of the print head is short, the print density becomes high. In the case of a photosensitive recording medium in which exposure time is prolonged, high density is employed and this characteristic may be considered. Accordingly, there is no limitation.

In FIG. 1, reference numeral 3 shows reference level producing means for producing a reference level, and reference numeral 4 indicates comparing means for comparing an output of the image data correcting means 2 with the output of the reference level producing means 3. The output is derived as multi-value data (gradation data) from the image data correcting means 2. However, the data which may be utilized by the normal print head 8 must be entered only as such binary data, namely "1 (e.g., recorded)" and "0 (e.g., not-recorded)." As a result, in order to firmly perform the n-gradation recording operation, data must be transferred (n−1) time per 1 line in maximum. For example, when 256-gradation recording operation is carried out, data is required to be transferred 255 times.

To convert 256-value data (namely, output from image data correcting means 2) into binary data, both the reference level producing means 3 and the comparing means 4 are employed. In other words, the 256-value data is compared with the reference level outputted from the reference level producing means 3 by the comparing means 4. For instance, while the reference level is smaller than the 256-value data, "1" is continuously outputted as the binary data. When the reference level becomes larger than, or equal to the 256-value data, "0" is continuously outputted. In other words, when the output of the image data correcting means 2 is "n", "n" pieces of "1" and further (255–n) pieces of "0" are outputted. It should also be noted that the reference level producing means 3 is constituted by a counter and the like. This counter is reset to "0" at a top of 1 line, and is counted up in synchronism with a clock (not shown) entered into the reference level producing means 3.

In FIG. 1, reference numeral 5 indicates data transferring means for transferring the comparison result of the comparing means 4 as head data to the print head 8. Reference number 6 indicates latch control means for latching data of the print head 8. Reference numeral 7 shows strobe control means capable of exposing the print head 8. Reference numeral 8 indicates a print head.

As the print head 8, a light source control type element may be employed. This light source control type element contains a self-light emitting type element such as an EL and an LED, and also a liquid crystal shutter element. For instance, in the latter case, 640 pieces of liquid crystal shutter elements are provided in a line shape. While light emitted from a light source (not shown) is selectively driven, transmission time of this light is controlled, so that a desirable image can be formed. For example, as the above-described liquid crystal shutter element, twisted nematic type liquid crystal is sealed into glass plates, and furthermore, two sheets of polarization plates are arranged on both sides of the glass plates in such a manner that absorption axes thereof are shifted from each other by 90 degrees. In accordance with this liquid crystal shutter element, when no voltage is applied to this LCD shutter element, this shutter element is brought into a transmission (transparent) condition, whereas when a voltage is applied thereto, this LCD shutter element is brought into a shielded condition. Since the exposure time of this LCD shutter element can be controlled by controlling the voltage non-application time, images containing dark/light pixels can be formed.

Figure 6:
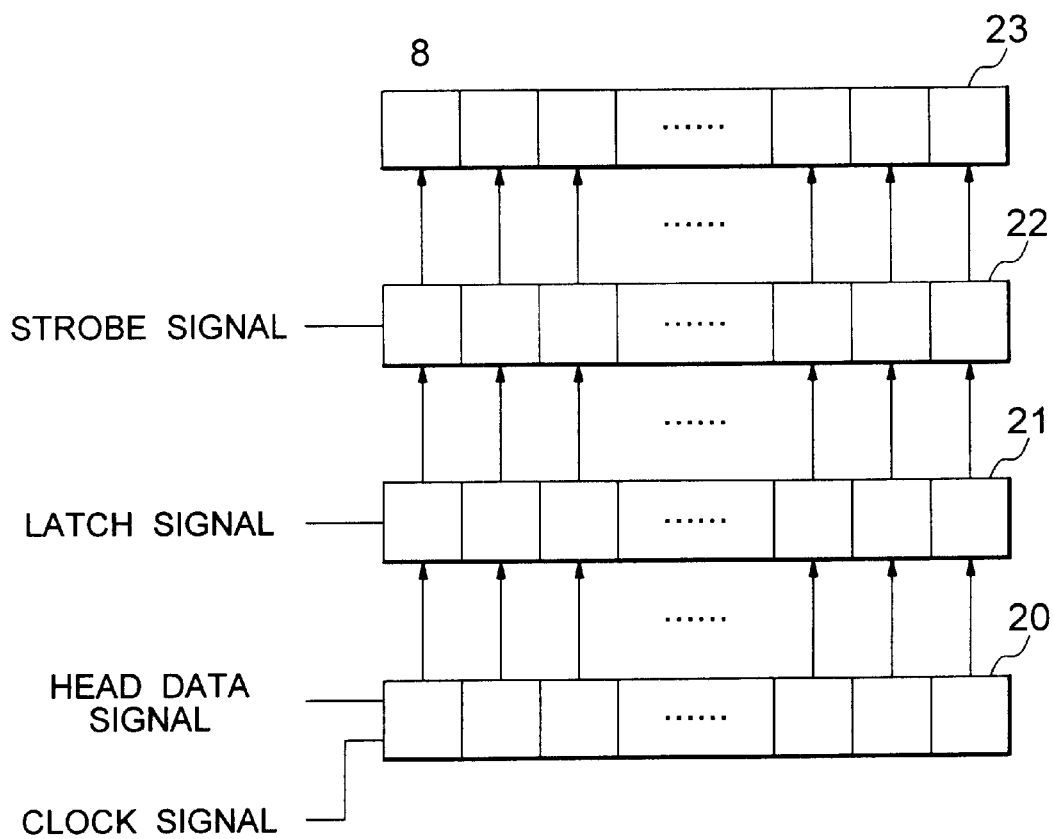
FIG. 6 illustratively indicates a structure of a print head provided in the optical printing apparatus according to the embodiment mode 1 of the present invention.

FIG. 6 schematically shows a structure of the print head. In FIG. 6, reference numeral 20 shows a shift register for sequentially shifting a head data signal (binary data) corresponding to the output of the data transferring means 5 in synchronism with a clock signal (not shown). Reference numeral 21 shows a latch for latching the output derived from the shift register 20 in synchronism with the latch signal corresponding to the output of the latch control means 6. Also, reference numeral 22 indicates a driver for driving the liquid crystal switching element 23 in response to both a strobe signal corresponding to an output of strobe control means 7, and the output of the latch 21. Namely, this driver 22 applies a voltage to the LCD switching element 23.

Now, a description will be made of a method for driving the print head 8. A recording density characteristic of a photosensitive recording medium (not shown) normally owns such a characteristic shown in FIG. 7 with respect to an exposure amount (namely, exposure amount is defined by an amount of light penetrated through LCD shutter element 23 and light penetration time). As a result, when the exposure time (namely, width of strobe signal) is made constant every gradation, the density every gradation cannot become constant, so that the reproducibility of highlight portion and also shadow portion cannot be obtained. As a result, while the exposure time is controlled every gradation, such a control operation is carried out in order that both the recording density and the gradation characteristic represent linear characteristics. In this control operation, the interval of the latch signal is defined by a table, or a calculation manner as indicated in FIG. 25 (will be discussed later), so that an image having a superior gradation characteristic may be provided.

Next, printing operation of the above-explained optical printing apparatus according to this embodiment mode 1 will now be described with reference to drawings.

In FIG. 1 and FIG. 3, first, the image data entered into the image data input means 1 is corrected by the image data correcting means 2 in response to the fluctuation contained in the print head 8. Concretely speaking, both positional information produced from the control means (not shown) and the image data are inputted to the image data correcting means 2 at the substantially same timing, and thereafter, this image data is converted as the corrected image data as indicated in FIG. 5.

Next, the output (reference level) derived from the reference level producing means 3 and the output from the image data correcting means 2 are compared with each other by the comparing means 4 (namely, data for print head 8 is produced), and then, the print head 8 is driven by the data transferring means 5, the latch control means 6, and the strobe control means 7.

Figure 8:
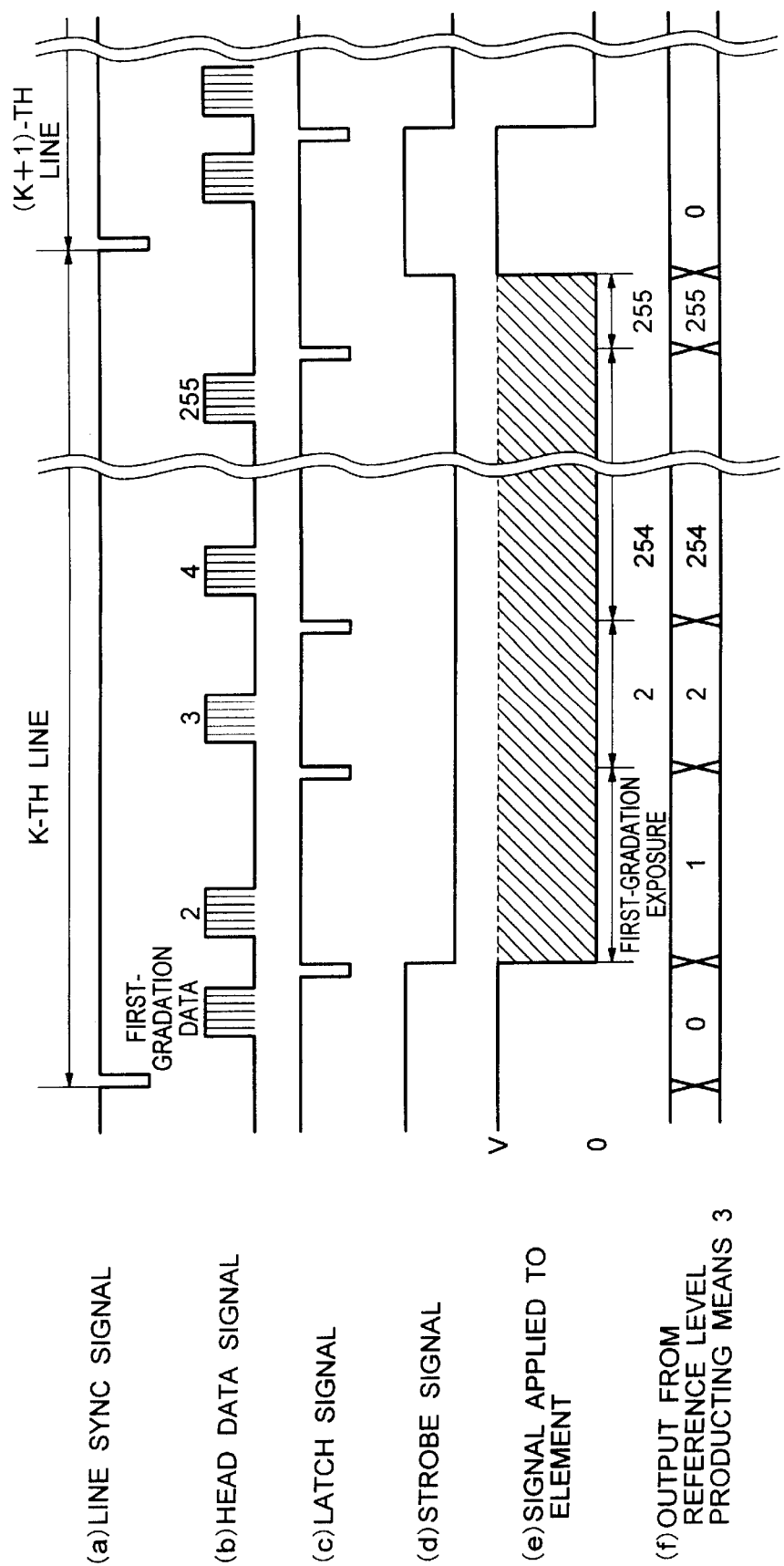
FIG. 8 is a timing chart for indicating a driving method of the print head of the optical printing apparatus according to the embodiment mode 1 of the present invention.

FIG. 8 is a diagram for schematically showing a concrete method used to drive the print head 8. In FIG. 8(*a*), a line sync (synchronization) signal outputted from the control means (not shown) is equal to a sync signal of each of lines, and a pulse interval of line sync signals constitutes a recording time period. This recording time period depends upon the sensitivity of the photosensitive recording medium, is substantially equal to 0.5 ms to 3 seconds.

As the drive operation, first of all, the reference level producing means 3 is reset by the control means (namely, "0" is outputted) in synchronism with a falling signal of a line sync signal. Then, the output of the image data correcting means 2 is compared with the reference level by the comparing means 4.

For instance, when the image data outputted from the image data correcting means 2 is a data stream such as "0", "128", "255", - - - , "1", the image data is converted into binary data such as "0", "1", - - - , "1" as first gradation data, and the data transferring means 5 supplies the above-explained binary data (head data signal) to the print head 8, which is synchronized with a head clock signal (not shown). Concretely speaking, this data transferring means 5 outputs the binary data to the shift register 20 shown in FIG. 6.

Then, in response to an instruction issued from the control means (not shown) the latch control means 6 outputs a latch signal. This instruction implies that the transfer operation of the first-gradation data has been completed. Then, based upon this latch signal, the reference level producing means 3 is incremented. Also, in response to this latch signal, the data stored in the shift register 20 is latched by the latch 21, and the second-gradation data stream is entered into the shift register 20 within the print head 8.

On the other hand, by receiving this latch signal, in response to another instruction issued from the control means (not shown), the strobe control means 7 enables the strobe signal. Then, inside the print head 8, when both the data latched in the latch 21 and the strobe signal derived from the strobe control means 7 are entered into the driver 22, the LCD shutter element 23 is selectively driven by a desirable voltage (V and 0), so that the data recording operation with respect to the first-gradation data is carried out by this print head 8. Furthermore, a similar data recording operation is repeatedly carried out within 1 line, so that an image of 1 line can be formed. Since a similar data recording apparatus is repeatedly in the unit of 1 line, an image forming operation for 1 screen can be accomplished.

As previously described in detail, in accordance with this embodiment mode 1, there are such effects that the fluctuations of the liquid crystal shutter element 23 can be firmly corrected, and further, the low-cost optical printing apparatus having the superior expanding characteristic can be obtained.

In accordance with this embodiment mode, various modifications and various combinations may be realized without departing from the technical scope and spirit of the present invention.

For example, in the above-described embodiment mode 1, the optical printing apparatus is arranged in such a manner that the data are received plural times (255 times in the above example) within 1 line from the external host computer (not shown). Alternatively, in order to shorten the data transfer time between the external host computer and the own optical printing apparatus, such an image data storing means 12 for storing thereinto a preselected capacity (e.g., 1-line data capacity and 1-screen data capacity) may be provided, as indicated in FIG. 9 and FIG. 10.

Figure 9:
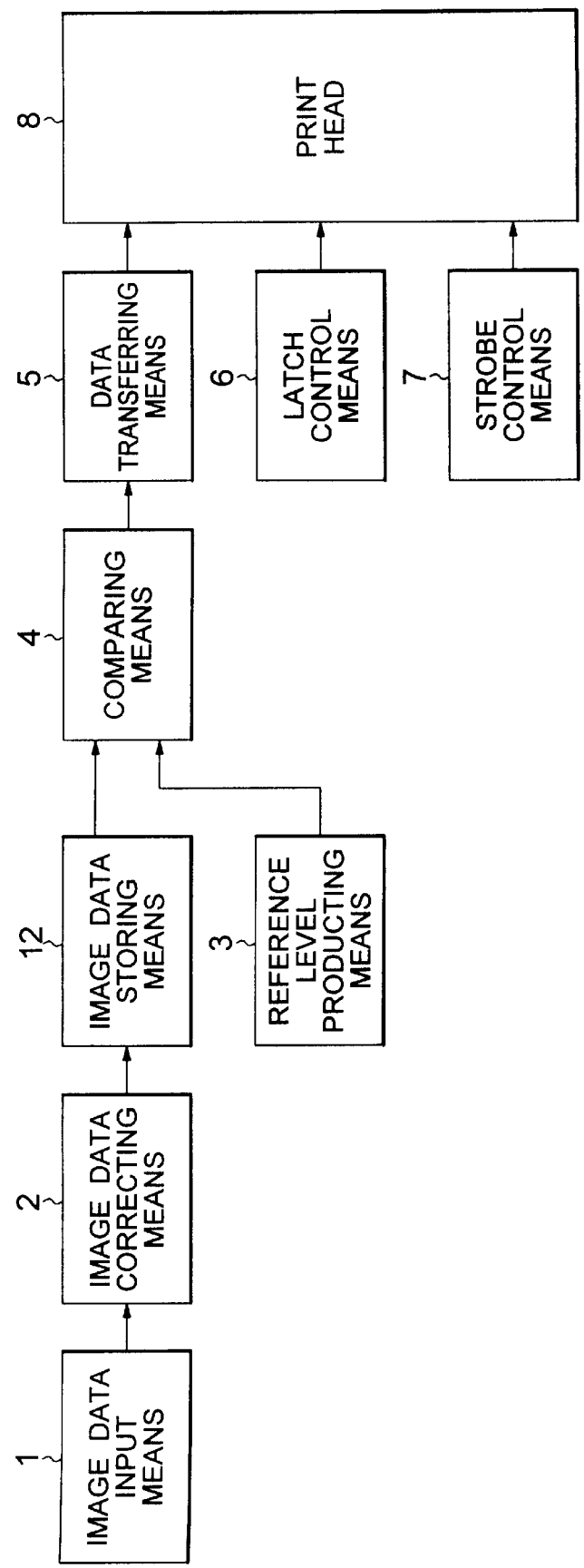
FIG. 9 is a schematic block diagram for showing an arrangement of a modification of the optical printing apparatus according to the embodiment mode 1 of the present invention.

For instance, in the alternative case of FIG. 9, the output of the image data storing means 2 is stored into this image data storing means 12. In the alternative case of FIG. 10, the output result of the image data input means 1 is stored into this image data storing means 12. In these alternative cases, the address of the image data storage means 12 may be controlled by the control means (not shown), so that the image data are stored in the desirable order.

Figure 10:
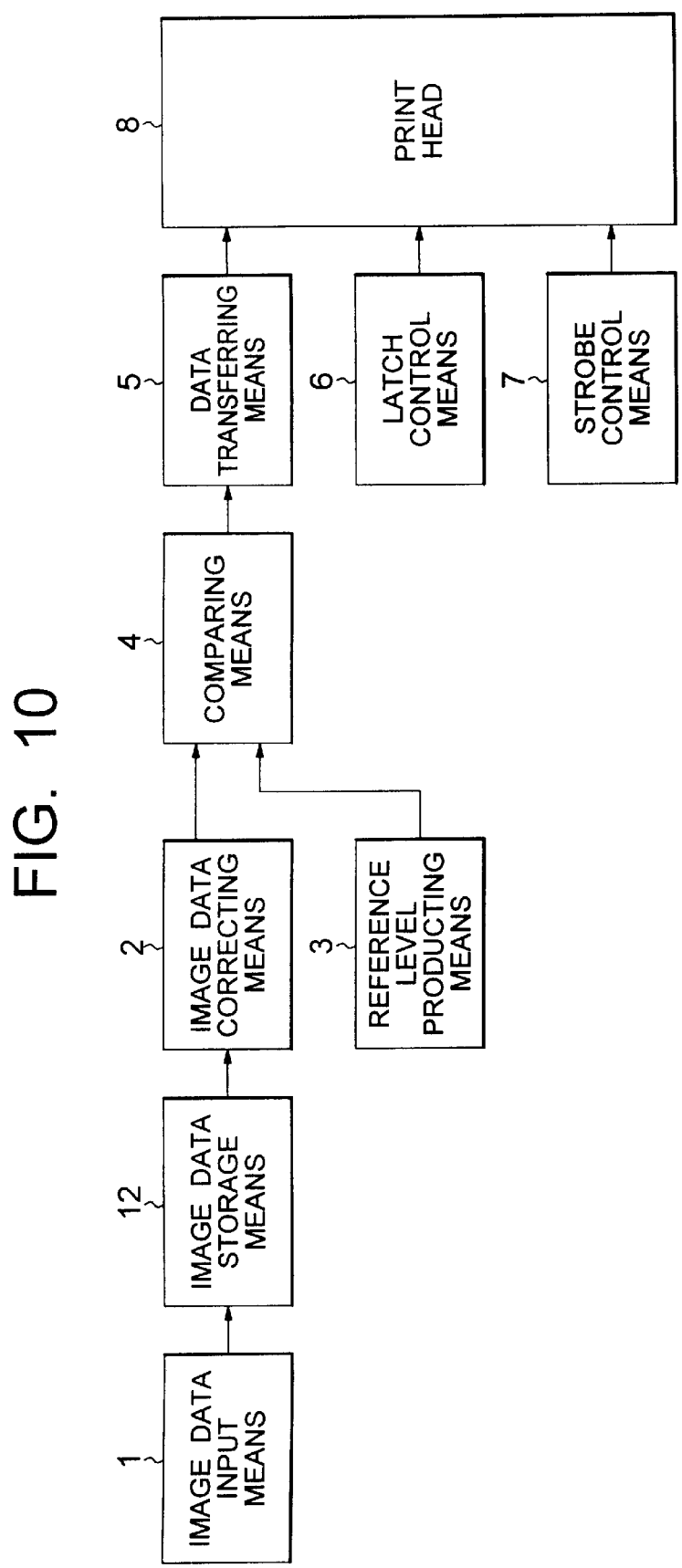
FIG. 10 is a schematic block diagram for showing an arrangement of another modification of the optical printing apparatus according to the embodiment mode 1 of the present invention.

Furthermore, the optical printing apparatus may be arranged by combining the arrangements of FIG. 9 and FIG. 10. In other words, the output result of the image data input means 1 is first stored in the image data storing means 12 provided at a pre-stage for 1 image capacity of the image data. Then, 1-line image data is stored into another image data storing means 12 provided at a post stage after being processed by the image data correcting means 2.

Furthermore, in the above-described embodiment (for example, in FIG. 8), a plurality of head data signals corresponding to the output of the data transfer means 5 are transferred to every gradation, which equals to the total element number of LCD shutter element 23 of the print head 8. Alternatively, in order to increase the data transfer speed with respect to the print head 8 (namely, in order to shorten recording period), a plurality of data may be transferred in a parallel mode.

Figure 11:
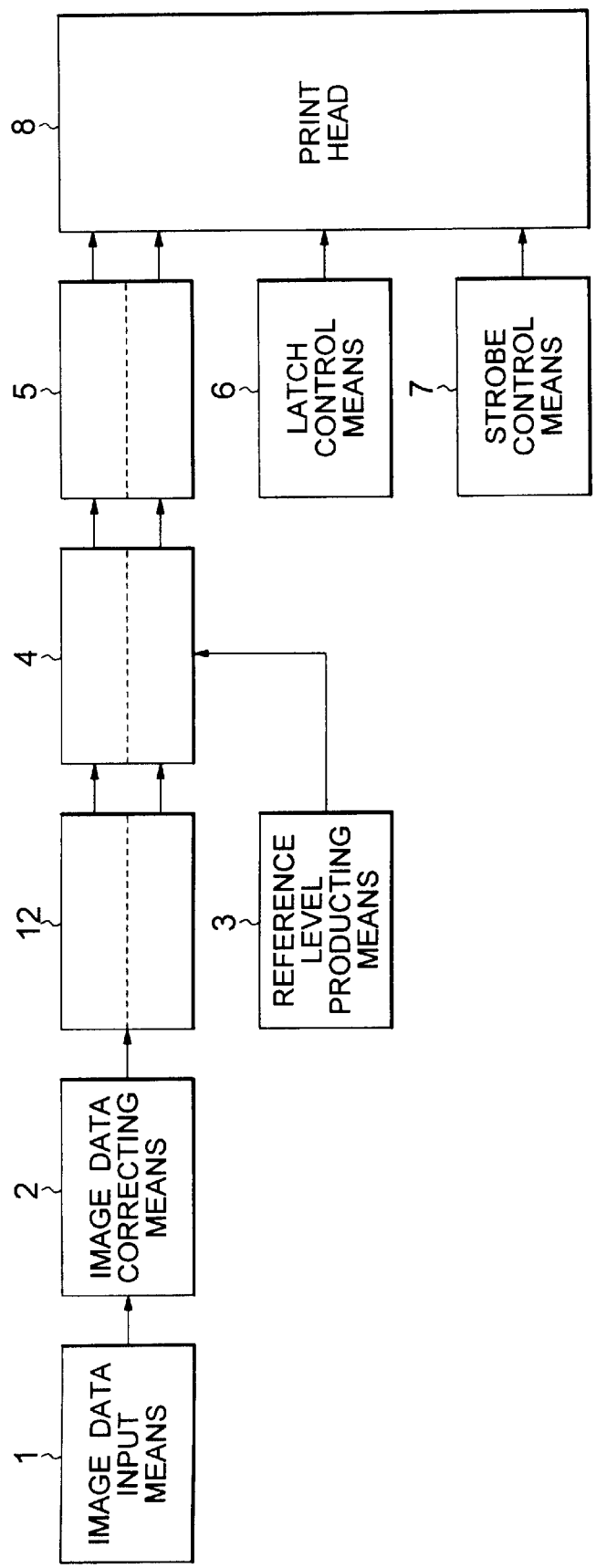
FIG. 11 is a schematic block diagram for showing an arrangement of another modification of the optical printing apparatus according to the embodiment mode 1 of the present invention.

For instance, FIG. 11 is a schematic block diagram for indicating an arrangement of another optical printing apparatus constituting a plurality of data transferred in a parallel manner. In the image data storing means 12, image data of 1 line (for instance, when 640 elements are employed in print head 8 and when the image data of 1 line are assumed as 640 pixels) are stored, while the image data of 1 line are subdivided into two image data blocks. That is, one image data block is defined from first image data up to 320-th image data, and the other image data block is defined from 321st image data up to 640-th image data. Next, the first image data and the 321st image data are outputted substantially at same time at a desirable timing. Also, the first image data is compared with the 321st image data by the comparing means 4, and then the comparison result may be entered via the data transfer means 5 to the print head 8.

Figure 12:
FIG. 12 is a timing chart for indicating a drive method of a print head employed in the modification shown in FIG. 11.
Figure 13:
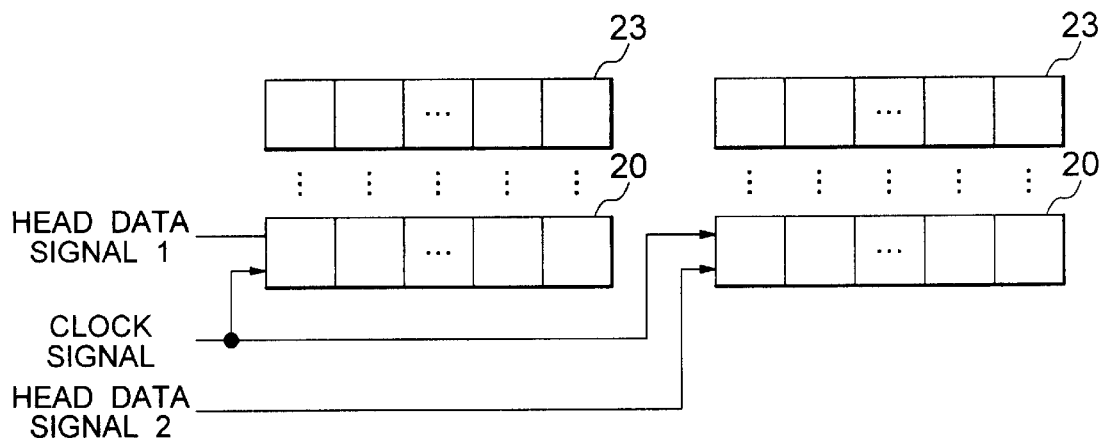
FIG. 13 illustratively shows a structure of the print head provided in the modification of FIG. 11.

Drive conditions of the print head 8 at this stage are indicated in FIG. 12 and FIG. 13. FIG. 12 corresponds to FIG. 8, and FIG. 13 corresponds to FIG. 6. Since there are provided two sets of head data signals, the transfer time may be reduced by ½. As previously explained, in the example shown in FIG. 12, or FIG. 13, two sets of the head data signals are employed, but more than 3 sets can be employed. Also, a plurality of latch signals and/or a plurality of strobe signals may be provided. Furthermore, in such a case that the plural head data signals, the plural latch signals, and the plural strobe signals are employed, temporal phase differences may be given thereto. The strobe control means 7 (the strobe signal) may also be eliminated. In this case, the driver 22 may drive the LCD switching element 23 only in response to the output of the latch 21. While the use of LCD switching element 23 has been described in the foregoing embodiment, it goes without saying that light emitting elements such as ELs or LEDs may be used in the same manner.

Also, in the above-described embodiment mode 1, the output of the reference level producing means 3 is incremented as "0", "1", - - - . Alternatively, this output may be decremented as "254", "253", - - - . This output may be properly incremented/decremented, depending upon the structure of the print head 8.

Figure 7:
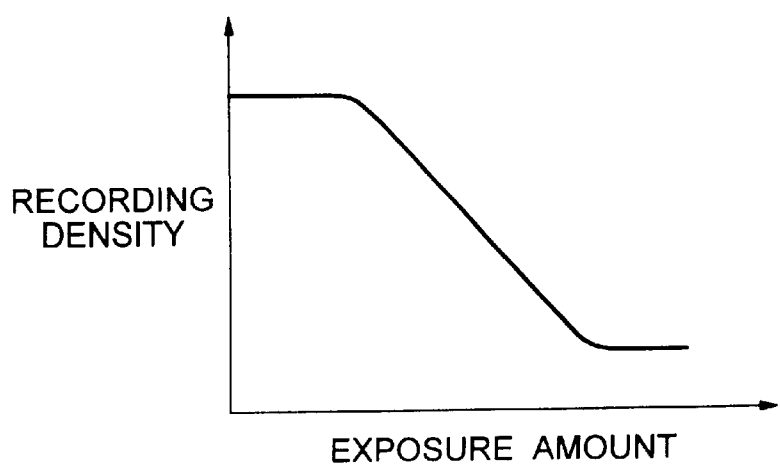
FIG. 7 is a graphic diagram for indicating a recording density characteristic of a photosensitive recording medium provided in the optical printing apparatus according to the embodiment mode 1 of the present invention.

Furthermore, in the above-described embodiment mode 1, "since the recording density characteristic of the photosensitive recording medium has a characteristic as shown in FIG. 7 with respect to the normal exposure amount, the exposure time is controlled at every gradation in such a manner that both the recording density and the gradation characteristic may represent the linear characteristic." The exposure amount is equal to a product made by the light amount of light penetrated through an element and the penetration time. Alternatively, the exposure time may be controlled in such a manner that lightness, luminance, and the gradation characteristic may represent the linear characteristic.

In addition, in the above-described embodiment mode 1, the structure of the image data correcting means 2 is made of the table structure. Alternatively, this table structure of image data correcting means 2 may be replaced by a calculation structure. Also, the storage content of the fluctuation data storage means 10 may be replaceable when the print head 8 is replaced, or when the aging change occurs. Alternatively, the storage content of this fluctuation data storage means 10 may be replaced by other fluctuation data which are down-loaded from an external appliance. Furthermore, the fluctuation data used in the actual recording operation are stored in the fluctuation data storage means 10. Alternatively, such fluctuation data which are acquired by measuring light amounts when the LCD shutter element is brought into transmission state during constant time period may be stored into this fluctuation data storage means 10. Also, as to the fluctuation error, the table is formed based upon the error deviated from the average error. Alternatively, the fluctuations may be obtained from desirable absolute density.

Figure 14:
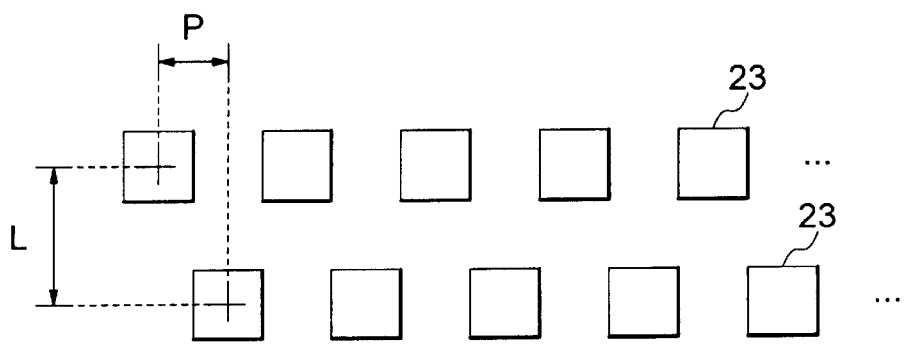
FIG. 14 is an illustration of a structure of a print head functioning as another modification employed in the optical printing apparatus according to the embodiment mode 1 of the present invention.

Also, as indicated in FIG. 14, the LCD shutter element 23 of the printer head 8 may be arranged in a stagger shape. In FIG. 14, symbol "P" shows an arranging pitch of the LCD shutter element 23, and symbol "L" represents an interval between an even-numbered element column and an odd-numbered element column. In this case, the arranging pitch "P" corresponds to resolution. For example, in the case of 300 DPI (Dot Per Inch), the resulting resolution becomes approximately 85 $\mu$m. On the other hand, the value of this interval "L" may be determined as any arbitrary value obtained by multiplying the arranging pitch P by, for example, 2, or 1.5. Similar to the above-explained drive method, the data transfer timing to the print head 8 may be determined by this interval "L" value.

The reason why the LCD shutter element 23 is arranged in the stagger shape is given as follows. That is, if the LCD shutter elements 23 are arranged along one column, then there is such a problem that a black stripe and/or a white stripe may be readily produced in a recorded image, which is caused by a space defined between the LCD shutter element 23 and the LCD shutter element 23 positioned adjacent thereto. This space is caused by the aperture efficiency and the electrode arrangement. Therefore, since the LCD shutter element 23 is arranged in the stagger shape, this problem can be solved.

Figure 15:
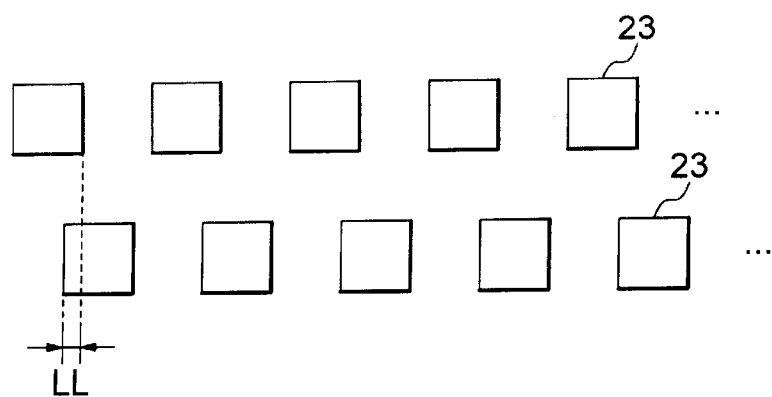
FIG. 15 is an illustration of a structure of a print head functioning as another modification employed in the optical printing apparatus according to the embodiment mode 1 of the present invention.

Furthermore, as shown in FIG. 15, since the LCD shutter elements 23 may be arranged in such a manner that the LCD shutter elements 23 arranged along at least the main scanning direction are overlapped with each other, it is possible to form an image having a higher image quality. This is because the fluctuations caused by the errors occurring in the drive system and the electric system when the recorded image is formed can be largely reduced and the black stripe can be eliminated by relatively moving the photosensitive recording medium and the print head 8, and also the black stripe can be eliminated by relatively moving the photosensitive recording medium and the print head 8.

FIG. 16 is a graphic diagram for representing an overlap "LL" between the LCD shutter element 23 and the adjoining LCD shutter element 23. An ordinate represents a subjective evaluation result, and an abscissa indicates an LL/P (namely, ratio of pitch "P" to overlap "LL" of LCD shutter element 23). As apparent from FIG. 16, when the value of LL/P is larger than, or equal to 0.05 and also smaller than, or equal to 0.5, it can be recognized as a better image quality. Preferably, this LL/P value is larger than, or equal to 0.1, and smaller than, or equal to 0.4. This graphic representation can be considered as follows. When the LL/P value becomes excessively small, the overlap effect is reduced, the black stripe occurs easily and deterioration in the image quality is recognized. On the contrary, when the LL/P value becomes excessively large, the resulting resolution is lowered, so that the image quality is deteriorated.

It should be understood that the above-described LL/P values may be defined at the above-explained value range for an image quality to be judged as "better image quality", depending upon various conditions. For example, an optical condensing means is provided between the LCD shutter element 23 and the photosensitive recording medium, or the sort of this optical condensing means is selected. Alternatively, the LL/P value may be substituted by the actual recording pixel value corresponding to the LCD shutter element 23, not by the overlap LL of the LCD shutter element 23. In addition, there is no limitation in the overlap along the sub-scanning direction, since this overlap may be replaced by relatively moving either the photosensitive recording medium or the print head 8. In other words, the element size along the sub-scanning direction and the drive method may be determined in such a manner that no lateral stripe appears in a recorded image.

Also, the LCD shutter element 23 is driven by the DC manner, but may be alternatively driven by an AC manner as shown in FIG. 17A and FIG. 17B. Also, the LCD shutter element 23 is brought into the transmission state when no voltage is applied thereto. Alternatively, even when the print head 8 is arranged by such that the LCD shutter element 23 is brought into the transmission state when a voltage is applied thereto, a similar effect may be achieved. Furthermore, the LCD shutter elements 23 are driven in the batch mode in the embodiment mode 1. Alternatively, while a plurality of strobe control means 7 are prepared, the LCD shutter elements 23 may be subdivided, and the subdivided LCD shutter elements may be driven. In this alternative case, there is a merit in a reduction of power consumption. In addition, the optical printing apparatus may be arranged by such a manner that not only the monochromatic image may be formed, but also a color image may be formed by exposing light with a plurality of wavelengths.

Embodiment Mode 2

Figure 18:
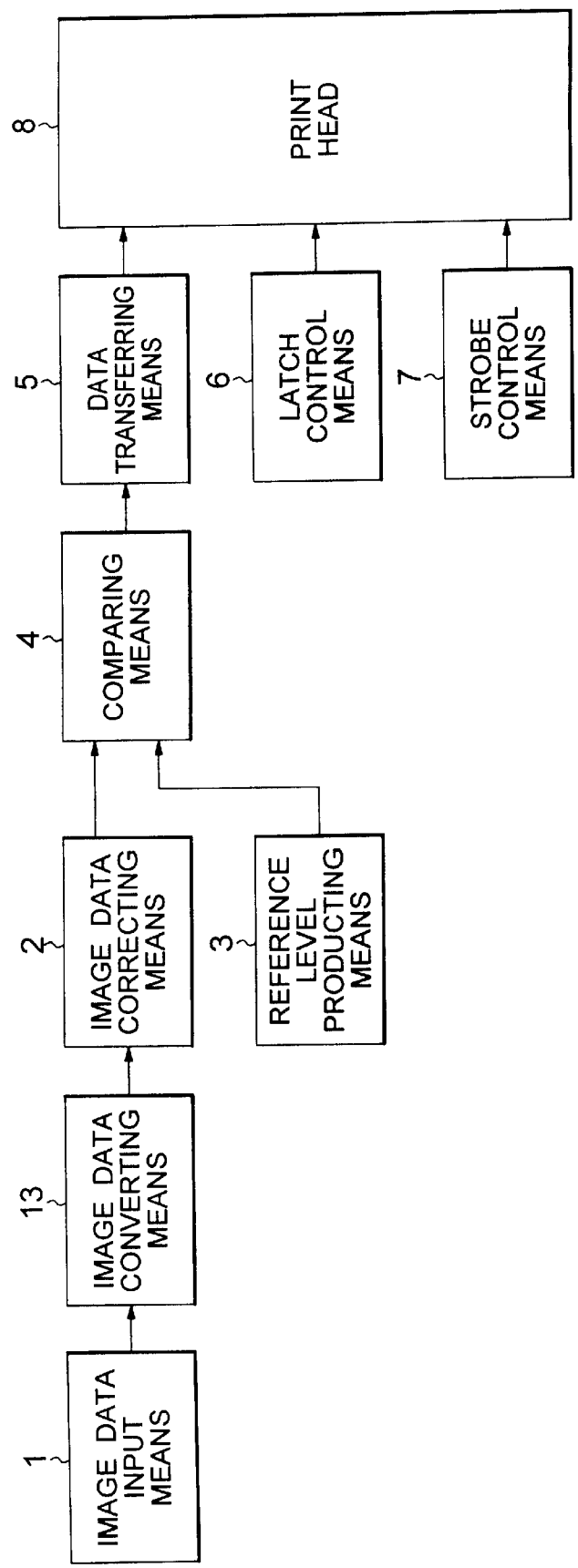
FIG. 18 is a schematic block diagram for showing an arrangement of an optical printing apparatus according to an embodiment mode 2 of the present invention.

Referring now to drawings, an optical printing apparatus according to an embodiment mode 2 of the present invention will be described. FIG. 18 is a schematic block diagram for indicating an arrangement of the optical printing apparatus according to this embodiment mode 2 of the present invention.

In FIG. 18, reference numeral 13 shows an image data converting means. The image data corresponding to the output of the image data input means 1 is entered into this image data converting means 13 so as to be converted. The converted image data is outputted to the image data correcting means 2. It should be noted that the same reference numerals shown in FIG. 18 will be employed as those for denoting the same, or similar structural elements of FIG. 1.

In this embodiment mode 2, the optical printing apparatus is featured by employing a small-scaled (low cost) arrangement, while achieving a high image quality recording operation. In other words, in the above-explained embodiment mode 1, in order to perform the gradation recording operation, the relationship of the gradation with respect to the recording density and the lightness is established in a linear manner by adjusting the non-linear characteristic of the recording density based upon the exposure time every gradation. As a consequence, a very large number of tables are necessarily required and also complex calculations must be carried out so as to execute the high image quality recording operation, while considering the non-linear characteristic. To the contrary, the optical printing apparatus according to this embodiment mode 2 is arranged as follows. While intervals among latch signals are made substantially constant, image data is converted into the number of latches (will be referred to as "exposure levels" hereinafter). More specifically, the image data is converted into an exposure level larger than the image data. It should also be noted that the reason why the image data is converted into the exposure level larger than the image data is to improve the gradation characteristic. When the optical printing apparatus is wanted to be constructed of a low-cost structure, the image data need not be especially converted into such a large value.

Next, printing operation of this optical printing apparatus according to the embodiment mode 2 will now be explained with reference to drawings.

Figures 19A, 19B:
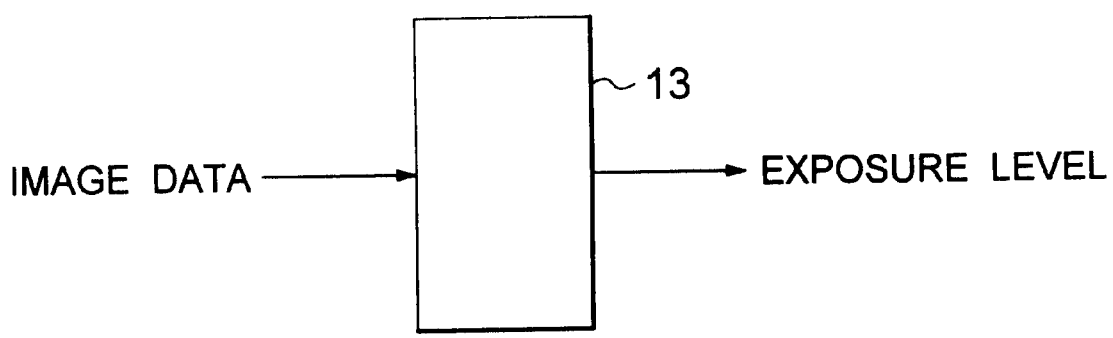
FIG. 19 is a schematic block diagram for indicating an arrangement of image data converting means employed in the optical printing apparatus according to the embodiment mode 2 of the present invention.

The image data for 1 line is entered as, for instance, 256-value data ("0" to "255") into the image data input means 1. These data values are sequentially inputted into an image data converting means 13. As shown in FIG. 19B, the image data converting means 13 is arranged by storage means such as either a ROM or a RAM. The image data is entered as an address into this image data converting means 13 to output the exposure level.

Specifically, a table made in accordance with a recording characteristic as indicated in FIG. 19A is stored in this image data converting means 13. In this image data converting means 13, when the image data is "3", this image data is converted into an exposure level of "54", and when the image data is "128", this image data is converted into an exposure level of "180." In this embodiment, the conversion from the image data into the exposure level is equal to an operation that the image data is converted into a total number of unit exposure time corresponding to a latch interval. The above-explained value of "54" implies that the unit exposure time is converted into 54 pieces of exposure time. It should also be noted that a relationship between the image data and the exposure level may be obtained by way of an experiment, or a calculation in such a manner that this relationship may become substantially linear with respective to either recording density or lightness.

Figure 20:
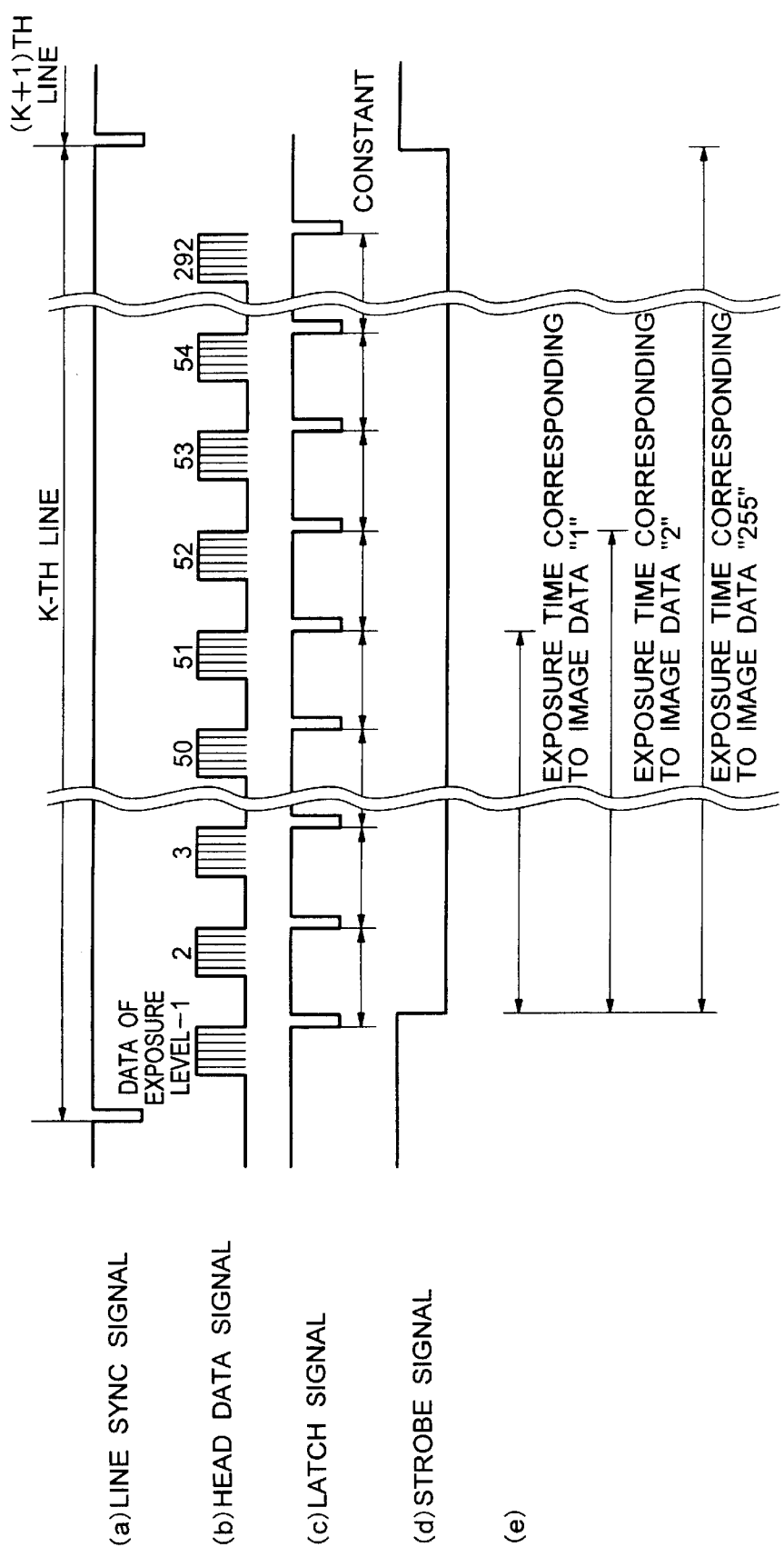
FIG. 20 is a timing chart for indicating a driving method of a print head of the optical printing apparatus according to the embodiment mode 2 of the present invention.

FIG. 20 is a diagram for schematically showing a concrete method used to drive the print head 8. As the drive operation, first of all, the reference level producing means 3 is reset by the control means (namely, "0" is outputted) in synchronism with a falling signal of a line sync signal (shown in FIG. 20(a). Furthermore, the image data is converted into an exposure level by the image data converting means 13. Then, the converted exposure level of the image data correcting means 2 is compared with the reference level by the comparing means 4.

Next, in the data transferring means 5, binary data (data corresponding to exposure level-1 among head data signals equal to outputs of comparing means 4) which is synchronized with a head clock signal (not shown) is supplied to the print head 8. Then, in response to an instruction issued from the control means (not shown), the latch control means 6 outputs a latch signal. This instruction implies that the transfer operation of the first data has been completed. Then, based upon this latch signal, the reference level producing means 3 is incremented. Also, in response to this latch signal, the data stored in the shift register 20 is latched by the latch 21, and a data stream corresponding to an exposure level-2 is entered into the shift register 20 within the print head 8.

On the other hand, in response to another instruction issued from the control means (not shown) by receiving this latch signal, the strobe control means 7 enables the strobe signal. This instruction instructs that the first latch signal is outputted. Then, inside the print head 8, when both the data latched in the latch 21 and the strobe signal derived from the strobe control means 7 are entered into the driver 22, the LCD shutter element 23 is selectively driven by a desirable voltage, so that the data recording operation with respect to the exposure level-1 is carried out by this print head 8. Furthermore, a similar data recording operation is repeatedly carried out within 1 line, and as shown in FIG. 20(e), the image data is converted into a total number of unit exposure time equivalent to the latch interval in response to such latch signals whose intervals are made substantially constant. As a result, the 1-line image forming is accomplished. Additionally, these similar operations are repeatedly carried out, so that an image forming operation for 1 screen can be accomplished.

As previously described in detail, in accordance with this embodiment mode 1, there are such effects that since the intervals of the latch signals are made substantially constant and the image data is converted into the corresponding exposure level, the calculation by the image correcting means 2 can be simplified (namely, since exposure level is substantially equal to exposure time, image data/exposure level conversion can be realized by a simple calculation). Also, since a total number of the tables contained in the strobe control means 7 can be reduced, the optical printing apparatus with a smaller circuit scale (low cost) can be realized while performing the high image quality recording operation.

It should be understood that various modifications and changes may be made in this embodiment mode 2. Similar to various changes as described in the embodiment mode 1, while an image data storage means 12 is provided, transfer time between the own optical printing apparatus and an external host computer (not shown) may be shortened, and also while a plurality of head data signals are employed, highspeed recording operations may be realized. Also, in the above-described embodiment mode, the reference level producing means 3 is incremented, and the enable timing of the strobe signal is triggered by receiving the latch signal, but which may be realized based upon information supplied from the control means (not shown).

Also, a similar effect may be achieved by constructing the optical printing apparatus in such a manner that the image data converting means 13 may convert the image data into the exposure level by way of the external host computer (not shown), the circuit provided in the appliance, or the software. That is, if the structural position of the image data converting means 13 is located in front of the comparing means 4, there is no limitation.

Figure 21:
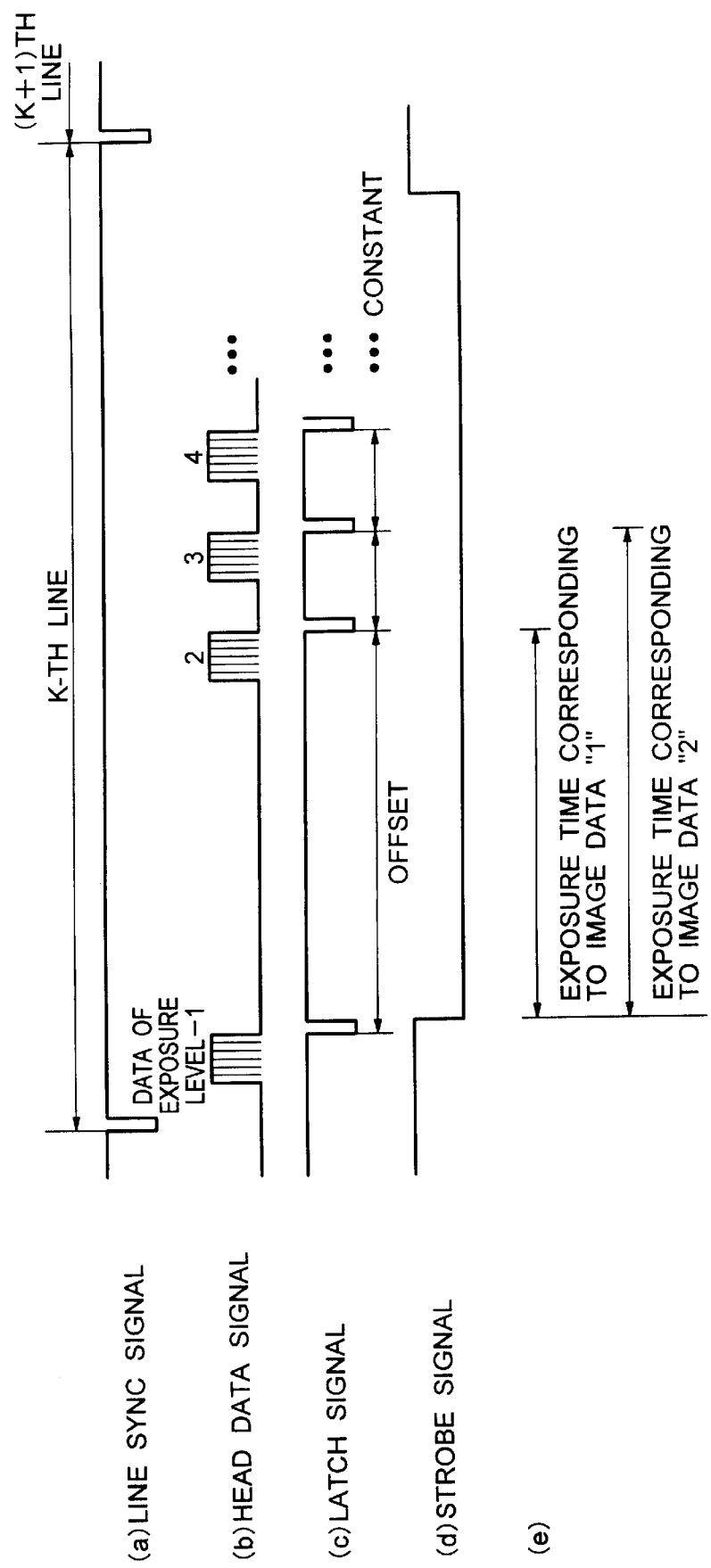
FIG. 21 is a timing chart for indicating a modified drive method of the print head employed in the optical printing apparatus according to the embodiment mode 2 of the present invention.

Also, as shown in the characteristic of FIG. 7, while considering such a characteristic (namely, characteristic of offset region) that even when the exposure light amount (namely, product made of light amount and time) is increased, the recording density is not changed, the dynamic range (a difference between maximum value and minimum value after image data has been converted into exposure level) of the exposure level may be reduced. Since this dynamic range of the exposure level is reduced, the data transfer times to the print head 8 may be decreased. A drive method of this case is shown in FIG. 21. A difference of drive methods between FIG. 20 and FIG. 21 is given as follows. The exposure time of the offset (corresponding to exposure level −1) is prolonged in correspondence with the characteristic. When the drive method of FIG. 21 is employed, the exposure time may be changed from "exposure time * unit exposure time (interval of latch signals)" into "offset+(exposure level −1) * unit exposure time." As in this case, even when the drive method is realized by considering the offset time (including time approximated to offset time), since the optical printing apparatus may be realized by the simple arrangement, a similar effect may be achieved.

Furthermore, in the above-described arrangement, an arrangement for solving a density variation with respect to a change in environmental temperatures may be added. Normally, transmittance of the LCD shutter element 23 is changed in response to a temperature. To correct this transmittance change, the following correcting method may be employed. That is, (1) temperature detecting means (thermistor, etc.,:not shown) is provided within the optical printing apparatus, or near the print head 8 so as to detect the temperature (namely, environmental temperature and head temperature of printer head 8); (2) this temperature detection result is entered into the strobe control means 7; (3), for example, as indicated in FIG. 22, while a relationship between the temperature and the exposure time of the offset region is saved as a memory table, the exposure time of the offset region may be corrected based upon the temperature. In this alternative case, it is possible to realize such a recording apparatus with a high image quality which is not adversely influenced by the temperature. Furthermore, the adverse influences caused by a difference in the characteristics caused by exposed colors, and also by humidities may be similarly corrected.

Embodiment Mode 3

Referring now to drawings, an optical printing apparatus according to an embodiment mode 3 of the present invention will be described. This embodiment mode 3 is accomplished by improving the optical printing apparatus of the above-described embodiment mode 2. That is, this optical printing apparatus may be realized with a low cost structure, and capable of performing a high image quality recording operation. Furthermore, a small amount of data may be transferred to the print head 8. As a result, even when a photosensitive recording medium having a high sensitivity is employed, the data transfer number, or the data transfer time does not constitute a bottle neck, but a high speed recording operation can be realized.

The optical printing apparatus of this embodiment mode 3 is featured by that an interval of latch signals which are equal to output results of a latch control means 6 within a recording period of 1 line is set to a ratio of approximately 1:2:4:8, - - - , 128. In other words, the interval of the latch signals is defined in correspondence with the respective bit weights in such a case that image data is expressed by a binary bit.

For example, a first description is made of 256(28)-value data. First of all, 8 sets of latch intervals are set to such a ratio of 1:2:4:8:16:32:64:128 (for example, ratio of 1 $\mu$s, 2 $\mu$s, 4 $\mu$s, 8 $\mu$s, 16 $\mu$s, 32 $\mu$s, 14 $\mu$s, 128 $\mu$s). The respective bits of the binary number are sequentially allocated from the LSB side.

In other words, in the case of "255"-value data, it becomes (LSB) 11111111 (MSB) expressed as the binary number. A summation of the exposure time (255 $\mu$s=1+2+4+8+16+32+64+128) may become actual exposure time. This exposure time summation corresponds to the ratio of the latch intervals 1 to 128. Also, in the case of "3"-value data, the latch intervals of 1 and 2, namely time of 3 $\mu$s may become exposure time. As previously explained, when the latch interval time is defined, the image data of 1 line can be recorded by transferring the image data 8 times (in case of 28-value data).

Next, printing operation of the optical printing apparatus according to this embodiment mode 3 will be described with reference to FIG. 1 and FIG. 23. First, when image data is entered into the image input means 1, the output (reference level) derived from the reference level producing means 3 and the output from the image data correcting means 2 are compared with each other by the comparing means 4 (namely, data for print head 8 is produced), and then, the print head 8 is driven by the data transferring means 5, the latch control means 6, and the strobe control means 7.

Figure 23:
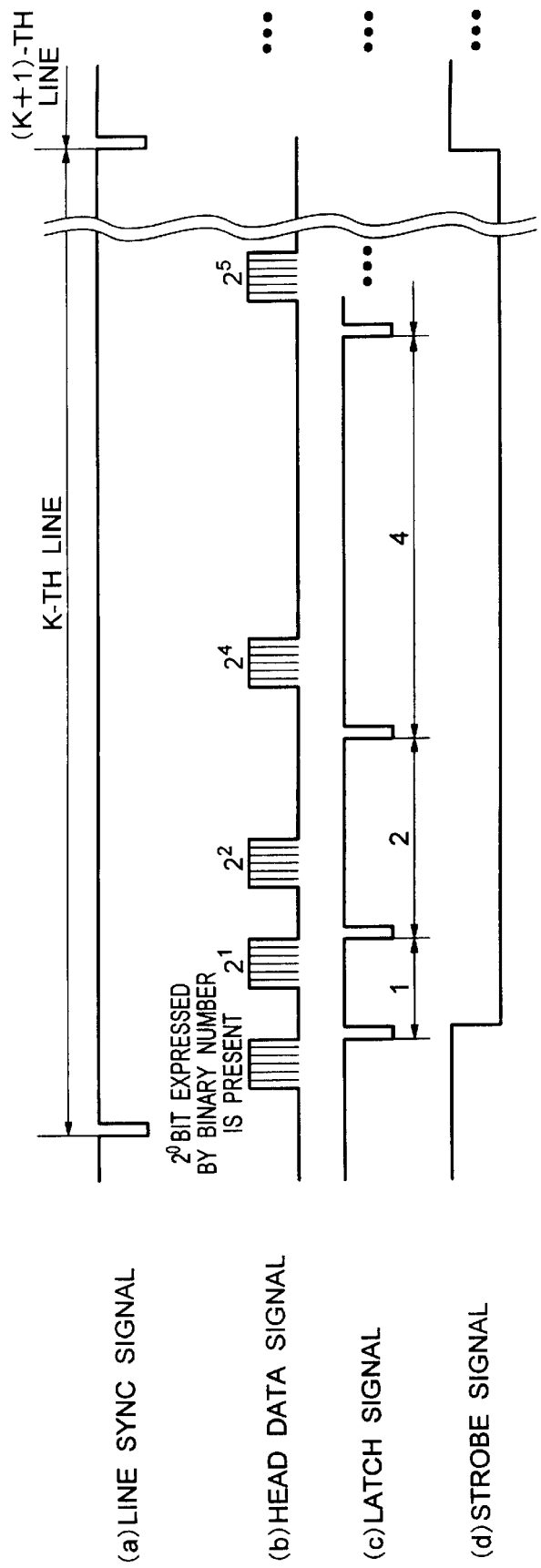
FIG. 23 is a timing chart for representing a drive method of a print head employed in an optical printing apparatus according to an embodiment mode 3 of the present invention.

FIG. 23 is a diagram for schematically showing a concrete method used to drive the print head 8. In FIG. 23, first of all, the reference level producing means 3 is reset by the control means (namely, "20=1" is outputted) in synchronism with a falling signal of a line sync signal shown in FIG. 23(a). Then, the output of the image data correcting means 2 is compared with the reference level by the comparing means 4. At this time, the comparing means 4 compares as to whether or not 20-th bit of the respective data is equal to "1" among the data outputted from the image data correcting means 4. When the 20-th bit of the data is equal to "1", the data transferring means 5 transfers data synchronized with a head clock signal (not shown) as binary data (recording data) to the print head 8. Concretely speaking, this data transferring means 5 outputs the binary data to the shift register 20 shown in FIG. 6.

Then, in response to an instruction issued from the control means (not shown), the latch control means 6 outputs a latch signal. This instruction implies that the transfer operation of the first data has been completed. Then, based upon this latch signal, the reference level producing means 3 outputs "21". Also, in response to this latch signal, the data stored in the shift register 20 is latched by the latch 21, and the next data stream is entered into the shift register 20 within the print head 8.

On the other hand, in response to another instruction issued from the control means (not shown) by receiving this latch signal, the strobe control means 7 enables the strobe signal. This instruction instructs such that the first latch signal is outputted. As a result, the LCD shutter element 23 is driven by a desirable voltage, so that the data recording operation with respect to the first image data is carried out by this print head 8. Furthermore, a similar data recording operation is repeatedly carried out within 1 line, so that an image of 1 line can be formed as follows. That is, in response to the latch signals whose interval ratio is selected to be approximately 1:2:4:8 - - - , 128, the image data is converted into such exposure time corresponding to the latch interval ratio. In addition, since these similar operations are repeated, the image forming operation of 1 screen can be accomplished.

As previously described in detail, in accordance with the optical printing apparatus of this embodiment mode 3, the interval of the latch signals (corresponding to the output result of the latch control means 6) within the recording time period of 1 line is substantially equal to the ratio of 1:2:4:8 . . . , 128. As a consequence, this optical printing apparatus may be realized with the low cost structure, and capable of performing the high image quality recording operation. Furthermore, a small amount of data may be transferred to the print head 8. As a result, even when the photosensitive recording medium having a high sensitivity is employed, the highspeed recording operation can be realized.

Also, in this embodiment mode 3, similar to the above-explained embodiment mode 1 and embodiment mode 2, various modifications, changes, and combinations may be carried out. Further, in this embodiment mode 3, the interval of the latch signals are increased in such a manner that the interval ratio of the latch signals is set to approximately 1:2:4:8, - - - , 128. Alternatively, this interval ratio of the latch signals may be set to 128:64:32, - - - , 1, (namely, reverse order), or 1:4:2:8, - - - (namely, mixed order). These interval ratios may be realized by uniquely determining a relationship between the weighting operations of the bits and the interval ratios of the latch signals. A similar effect may be achieved even in these cases.

Embodiment Mode 4

Referring now to drawings, an optical printing apparatus according to an embodiment mode 4 of the present invention will be described. This embodiment mode 4 is accomplished by improving the optical printing apparatus of the above-described embodiment mode 1. That is, this optical printing apparatus may be realized by employing a strobe signal table which stores thereinto time of a strobe signal every gradation, corresponding to an output result of a strobe control means 7.

Next, printing operation of the optical printing apparatus according to this embodiment mode 4 will now be described with reference to FIG. 1 and FIG. 24. First, when image data is entered into the image input means 1, the output (reference level) derived from the reference level producing means 3 and the output from the image data correcting means 2 are compared with each other by the comparing means 4 (namely, data for print head 8 is produced), and then, the print head 8 is driven by the data transferring means 5, the latch control means 6, and the strobe control means 7.

Figure 24:
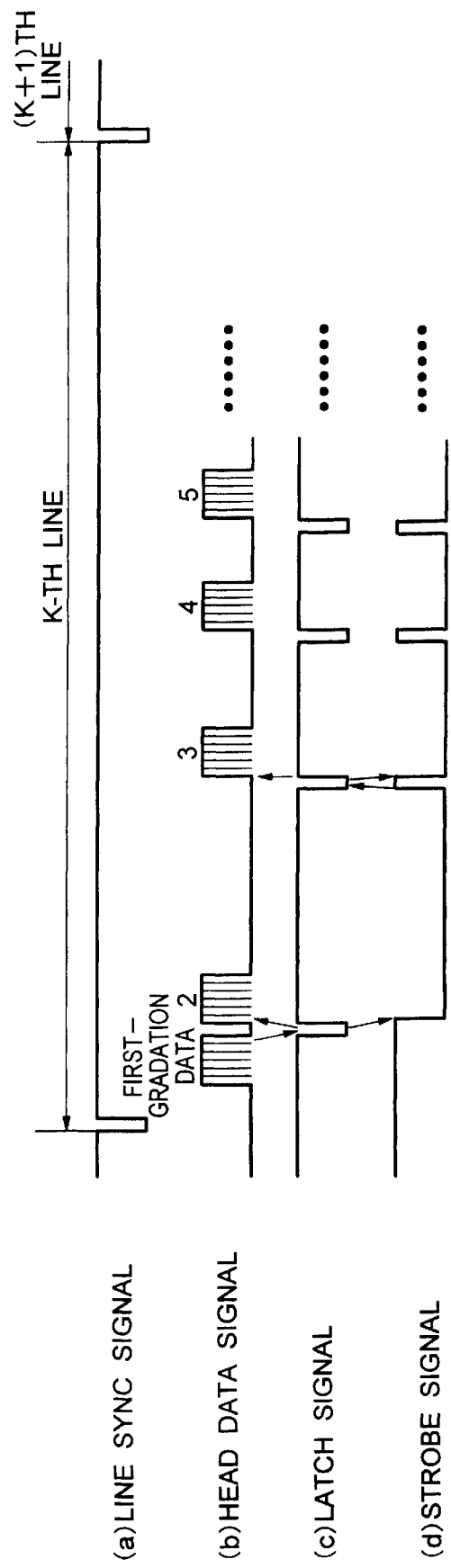
FIG. 24 is a timing chart for representing a drive method of a print head employed in an optical printing apparatus according to an embodiment mode 4 of the present invention.

FIG. 24 is a diagram for schematically showing a concrete method used to drive the print head 8. In FIG. 24, the reference level producing means 3 is reset by the control means (not shown) (namely, "0" is outputted) in synchronism with a falling signal of a line sync signal shown in FIG. 24(*a*). Then, the output of the image data correcting means 2 is compared with the reference level by the comparing means 4, and thereafter is outputted as binary data to the shift register 20.

Then, in response to an instruction issued from the control means (not shown), the latch control means 6 outputs a latch signal. This instruction implies that the transfer operation of the first-gradation data has been completed. Then, based upon this latch signal, the reference level producing means 3 outputs "1". Also, in response to this latch signal, the data stored in the shift register 20 is latched by the latch 21, and the second-gradation data stream is entered into the shift register 20 within the print head 8.

On the other hand, in response to another instruction issued from the control means (not shown) by receiving this latch signal, the strobe control means 7 enables the strobe signal. This instruction instructs that a latch signal for a first-gradation data is outputted. In this embodiment mode, an enable width of this strobe signal is saved as a memory table shown in FIG. 25. In other words, the strobe control means 7 outputs such a strobe width in correspondence with the output result (namely, in accordance with recording characteristic) of the reference level producing means 3. Then, the LCD shutter element 23 is selectively driven based upon both the data saved in the latch 21 and the strobe signal derived from the strobe control means 7, so that the recording operation for the first gradation data is carried out. Moreover, as shown in FIG. 24(*d*) and FIG. 24(*c*), in synchronism with a rising signal portion of the strobe signal, a latch signal is outputted from the strobe control means 7, so that third-gradation data is transferred and also a strobe signal corresponding to the second-gradation data is outputted. As previously explained, a similar data recording operation is repeatedly carried out within 1 line, so that an image of 1 line can be formed. Since a similar data recording apparatus is repeatedly in the unit of 1 line, an image forming operation for 1 screen can be accomplished.

As previously described in detail, in accordance with this embodiment mode 4, there are such effects that since the optical printing apparatus owns the strobe signal table for storing thereinto the time of the strobe signal (namely, output result of strobe control means 7) every gradation, the high image quality recording operation can be performed with the superior gradation characteristic although the low-cost arrangement is employed.

Also, in this embodiment mode 4, various modifications and changes as explained in the above-described embodiment modes 1 to 3 may be achieved. For instance, in the above-described arrangement, an arrangement for solving a density variation with respect to a change in environment temperatures may be added. As this arrangement, temperature detecting means (thermistor, etc,: not shown) is provided within the optical printing apparatus, or near the print head 8 so as to detect the temperature (namely, environmental temperature and head temperature of printer head 8). Thereafter, this temperature detection result is entered into the strobe control means 7, for example, as indicated in FIG. 26, while a relationship between the temperature and the strobe width of the first-gradation data is saved as a memory table, the strobe width of the first-gradation data may be corrected based upon the temperature. In this alternative case, it is possible to realize such a recording apparatus with a high image quality which is not adversely influenced by the temperature. It should also be noted that not only the strobe width of the first-gradation data, but also the remaining strobe width may be controlled in a fine mode. Furthermore, the adverse influences caused by a difference in the characteristics caused by exposed colors, and also by humidities may be similarly corrected.

Embodiment Mode 5

Figure 27:
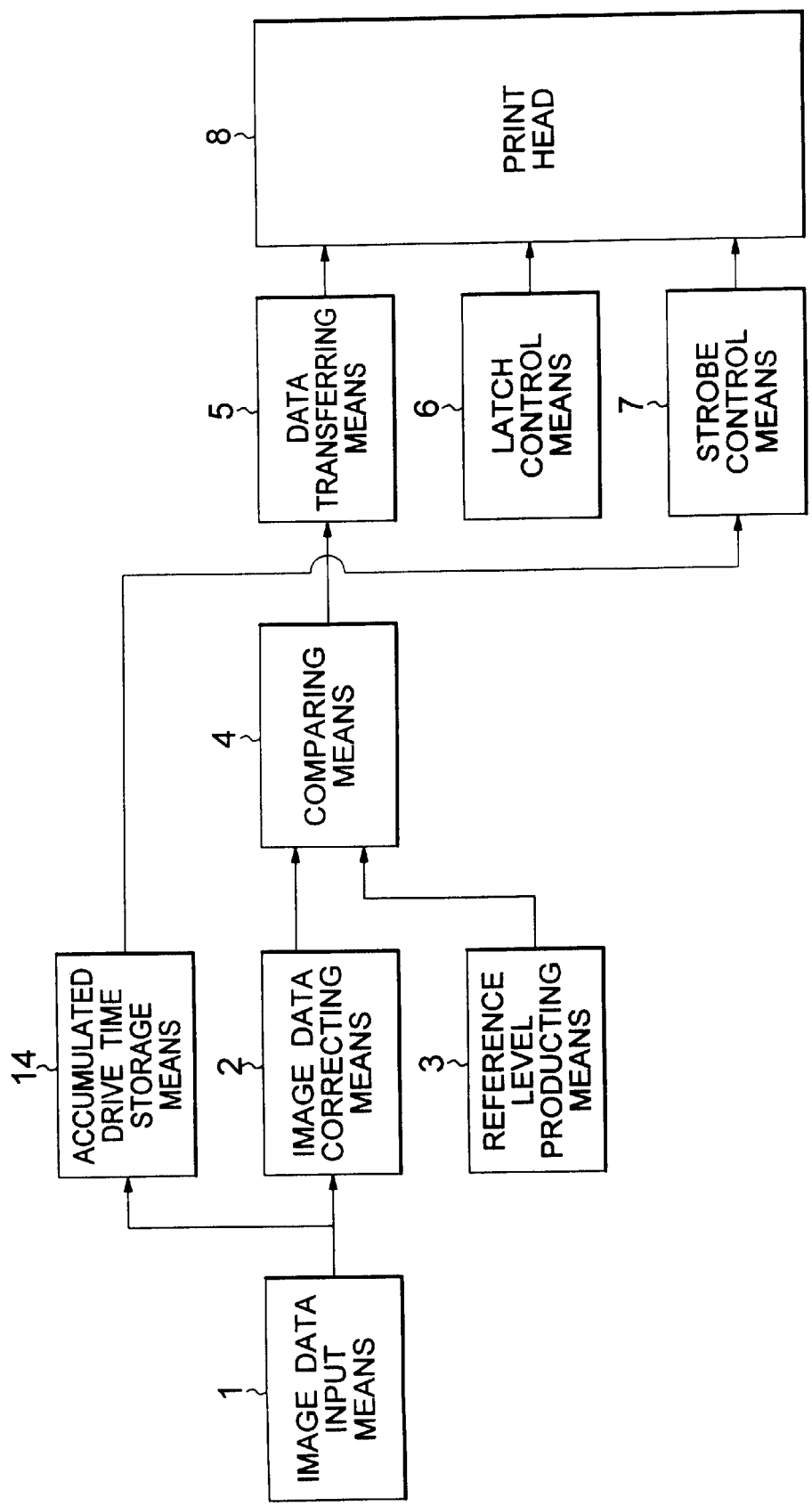
FIG. 27 is a schematic block diagram for showing an arrangement of an optical printing apparatus according to an embodiment mode 5 of the present invention.

Referring now to drawings, an optical printing apparatus according to an embodiment mode 5 of the present invention will be described. FIG. 27 is a schematic block diagram for indicating an arrangement of an optical printing apparatus according to this embodiment mode 5 of the present invention. It should be noted that the same reference numerals shown in FIG. 1 indicate the same, or similar structural elements indicated in FIG. 27.

In FIG. 27, reference numeral 14 indicates accumulated drive time storage means. This accumulated drive time storage means 14 is constituted by, for example, a RAM capable of saving data even when a power source is interrupted. In this accumulated drive time storage means 14, data corresponding to drive time of the print head 8 is stored. Normally, the aging change occurs in the print head 8 as to a light source (not shown), the LCD shutter element 23, or a color filter (not shown) in accordance with drive time.

Figures 28, 29:
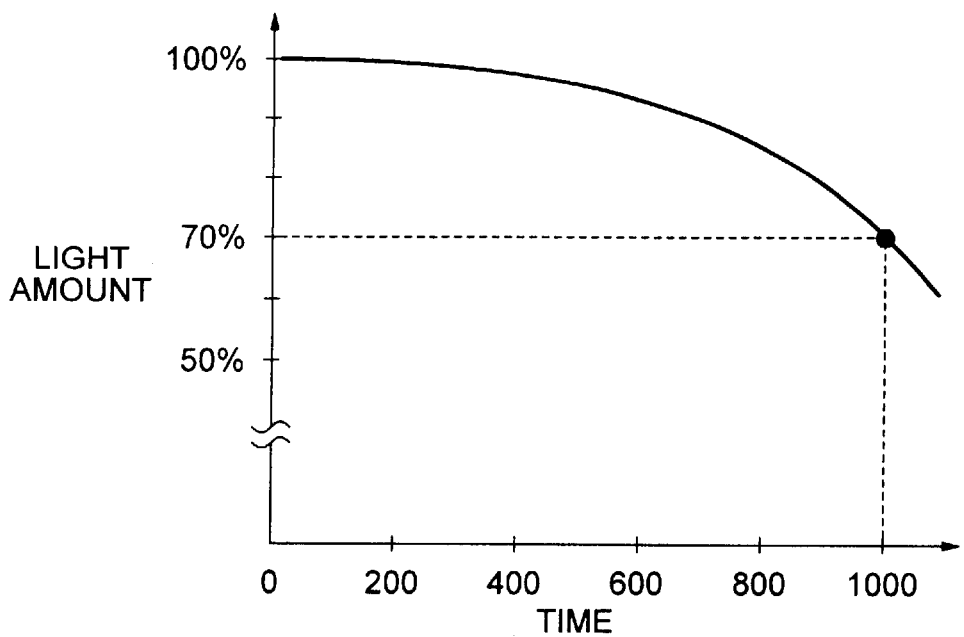
FIG. 28 is a graphic diagram for representing a light amount characteristic of an optical head employed in the optical printing apparatus according to the embodiment mode 5 of the present invention.
FIG. 29 is a diagram for indicating a structural example of an accumulated drive time storage means employed in the optical printing apparatus according to the embodiment mode 5 of the present invention.

FIG. 28 graphically represents a light amount characteristic on an exposure plane in the case that a certain LCD shutter element 23 is driven. As apparent from this graphic representation, there is such a trend that the light amount is decreased while drive time is increased. A degree in this light amount change varies, depending upon a material used to construct the print head 8. For example, a light amount at an initial stage is reduced by 70% when a print head is driven for approximately 1,000 hours.

Therefore, it is possible to accomplish an optical printing apparatus capable of being operated even under aging change by executing the following operation. That is, the drive time of the print head 8 is predictably measured, and also accumulated drive time is detected. In the conventional optical printing apparatus, such a complex arrangement is required that it employs the light receiving unit capable of directly measuring the light amount. In accordance with this embodiment mode 5, while finding out such a close relationship between the drive time and the light amount characteristic, the optical printing apparatus predictably measures the drive time without using the light receiving unit. As a result, this optical printing apparatus despite of such a low-cost arrangement, can realize a high image quality recording operation without being adversely influenced by the aging effect.

As a concrete method for predictably measuring the drive time, the below-mentioned method may be conceived:

(1). Image data is measured.

(2). A total number of line synchronization signal is counted.

(3). An output (binary data) from the comparing means 4 is measured.

(4). A total number of latch signal is counted.

(5). A strobe signal is measured.

Also, as to a subject to be corrected, the following correcting method may be conceived:

(6). An entire portion of the print head 8 is corrected.

(7). Either each of the LCD shutter elements 23 or a plurality of elements are separately corrected.

A description will now be made of printing operation of the above-explained optical printing apparatus according to the embodiment mode 5 with reference to FIG. 27. FIG. 27 schematically shows an arrangement of an optical printing apparatus in such a case that the above-described item (1) is selected as the method for predictably measuring the drive time, and also the item (6) is selected as the subject to be corrected.

First, image data which is entered into the image data input means 1 is inputted into the image data correcting means 2 in a similar manner to that of the above-explained embodiment mode 1, and furthermore, is inputted into the accumulated drive time storage means 14.

This accumulated drive time storage means 14 is reset to "0" when the own optical printing apparatus is shipped from a factory, or the print head 8 is replaced by a new one. Normally, this accumulated drive time storage means 14 is counted up upon entry of image data. Concretely speaking, since there is a correlative relationship between a value of image data and time required to drive the print head 8, an accumulated value of image data is directly stored into the accumulated drive time storage means 14; an average value of image data for 1 line is calculated and the average values are accumulated every line to thereby store the accumulated value thereinto; or while a maximum value of image data within a plurality of lines is accumulated every plural lines, the accumulated maximum value is subtracted by a preselected value (so as to reduce capacity of storage data) and thereafter the subtracted value is stored thereinto.

Next, the output from the accumulated drive time storage means 14 is entered into the strobe control means 7, and then is corrected like a strobe signal table of FIG. 29. FIG. 29 schematically indicates a relationship between a strobe width of first-gradation data and a value. The value is obtained in such a manner that an average value of image data for 1 line is calculated, the calculated average value is accumulated every line, and thereafter, the accumulated value is subtracted by a predetermined value. For instance, if the output from the accumulated drive time storage means 14 is equal to "550", then the strobe width of the first-gradation data is corrected as 55 µs in order to compensate for a lack of light amount. As to timing for reflecting the output of the accumulated drive time storage means 14, either timing of the line unit or timing of the screen unit may be employed, namely there is no specific limitation.

As previously explained in detail, in accordance with this embodiment mode 5, since the accumulated drive time is predictably measured, the high image-quality recording operation by the optical printing apparatus can be carried out which is not adversely influenced by the aging effect, even when such a complex arrangement for directly measuring the light amount is not employed, but a low-cost arrangement is provided.

It should be understood that also in this embodiment mode 5, various modifications and changes may be achieved as explained with respect to the embodiment mode 1 through the embodiment mode 4. Moreover, the items (1) to (5) as the method for predictably measuring the drive time and the items (6) and (7) as the subject to be corrected, may be arbitrarily combined.

Figure 30:
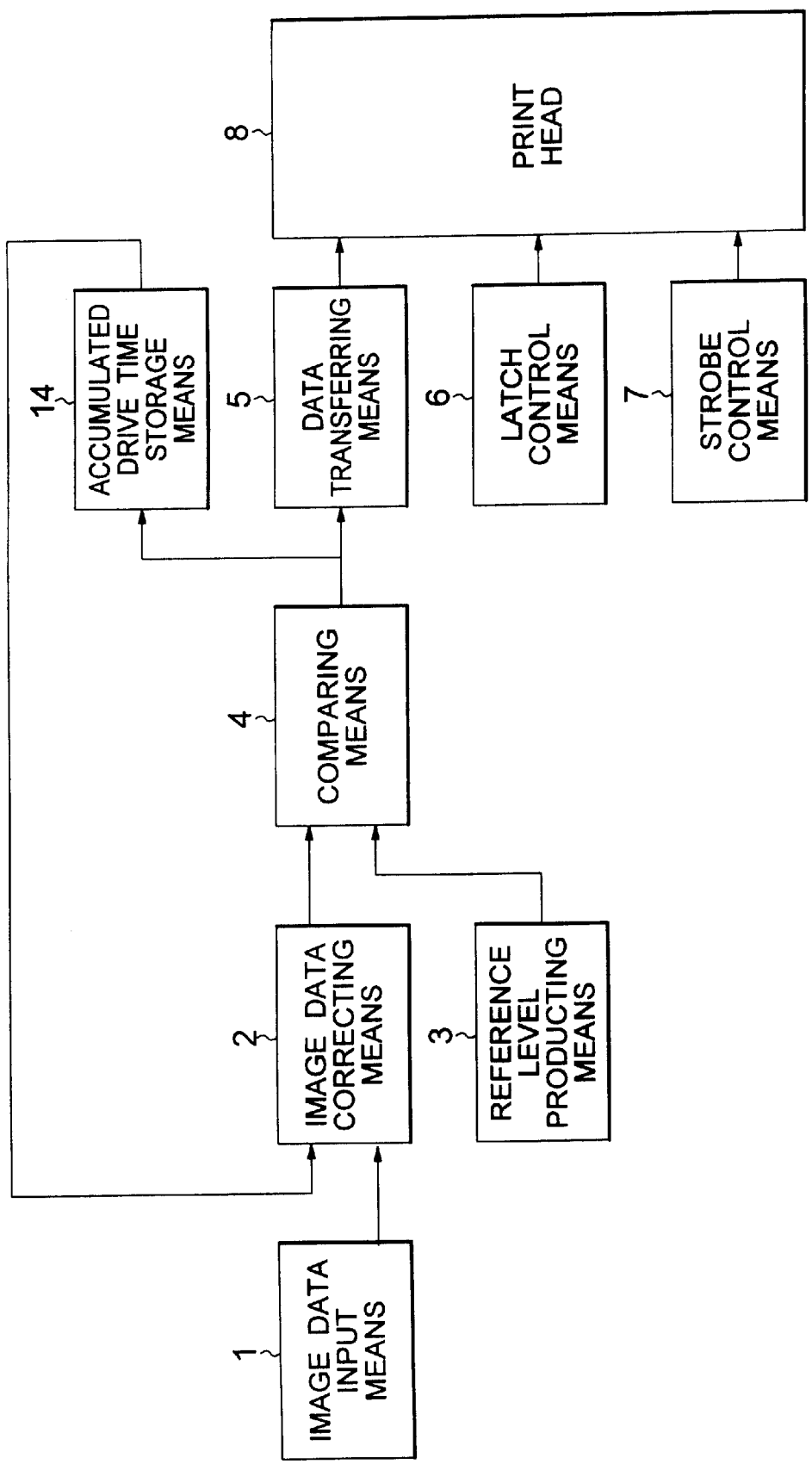
FIG. 30 is a schematic block diagram for showing an arrangement of a modification of the optical printing apparatus according to an embodiment mode 5 of the present invention.

For example, FIG. 30 schematically indicates such an optical printing apparatus realized by combining the above-explained item (3) with the item (7). In this drawing, first, after an output of the comparing means 4 has been entered into the accumulated drive time storage means 14, a binary data value is accumulated every LCD shutter element 23. Next, the accumulated drive time information is entered into the image data correcting means 2 in addition to positional information so as to correct the image data. In accordance with this arrangement, since the image data is corrected every LCD shutter element 23, it is possible to correct the image data in high precision based upon the aging change.

Embodiment Mode 6

Referring now to drawings, an optical printing apparatus according to an embodiment mode 6 of the present invention will be described. This embodiment mode 6 is accomplished by correcting a density variation caused by a difference in exposure positions along a main scanning direction.

Figure 36:
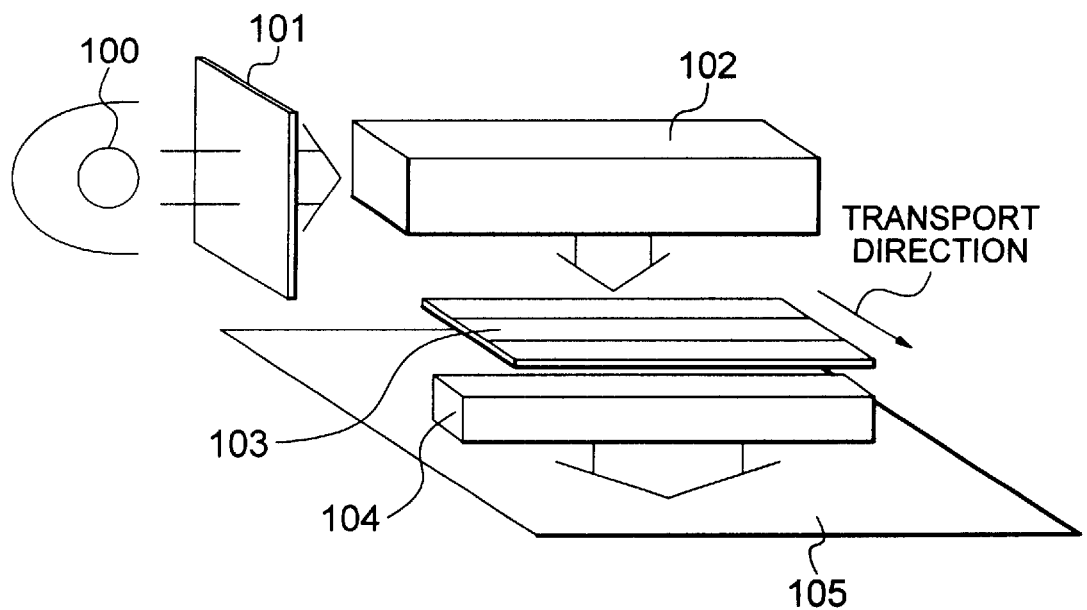
FIG. 36 is an illustration for indicating the arrangement of the conventional optical printing apparatus.

For instance, as indicated in FIG. 36, in such a case that light of a light source is irradiated from a side surface, or an upper surface, light amounts at the edge portions of the print head 8 which are located far from this light source will be readily lowered.

Figures 31, 32:
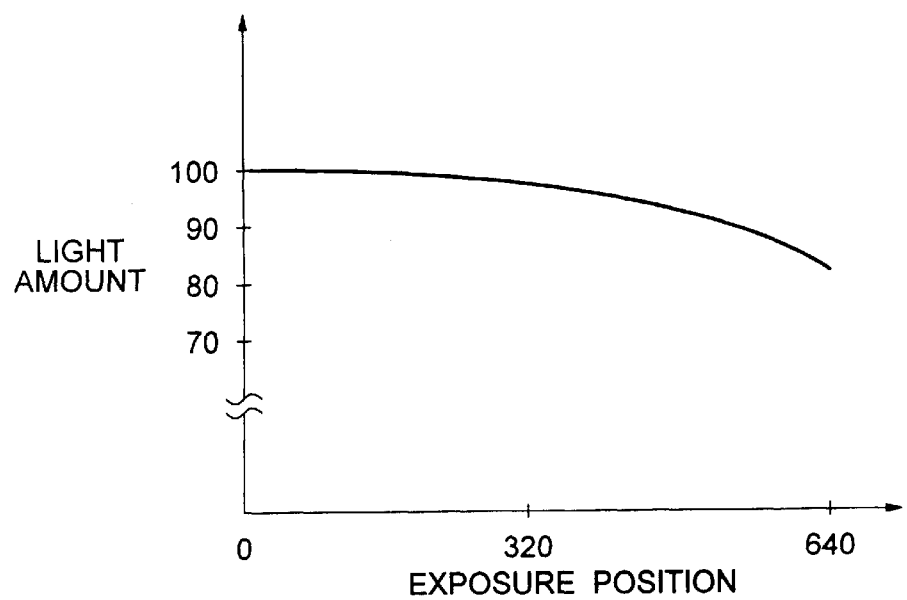
FIG. 31 is a graphic diagram for representing a light amount characteristic of an optical head employed in the optical printing apparatus according to an embodiment mode 6 of the present invention.
FIG. 32 is a diagram for indicating a structural example of an image data correcting means employed in the optical printing apparatus according to the embodiment mode 6 of the present invention.

For example, FIG. 31 graphically indicates a characteristic achieved in the case that light of a light source is irradiated from a side surface. It may be seen that the further the exposure position is separated from the light source (namely, on the side of 640-th element of LCD shutter element 23), the lower the light amount is decreased. A similar trend may appear even under such a condition that no fluctuation is contained in the LCD shutter element 23. As a consequence, if a lack of light amounts due to the exposure positions is corrected, then a high image quality recording operation can be carried out.

A description will now be made of printing operation of the above-explained optical printing apparatus according to the embodiment mode 6 with reference to FIG. 1, FIG. 3, FIG. 32, and FIG. 33. First, image data which is entered into the image data input means 1 is inputted into the image data correcting means 2 in a similar manner to that of the above-explained embodiment mode 1. The image data correcting means 2 is arranged by the fluctuation data storage means 10 and the fluctuation data converting means 11. Into this fluctuation data storage means 10, fluctuation data (group number) are stored in the order corresponding to the elements of the print head 8. These fluctuation data respond to such differences in the exposure positions as shown in FIG. 32. Then, the fluctuation data storage means 10 sequentially outputs the fluctuation data (group number) in response to the positional information supplied from the control means (not shown).

Figures 33, 34:
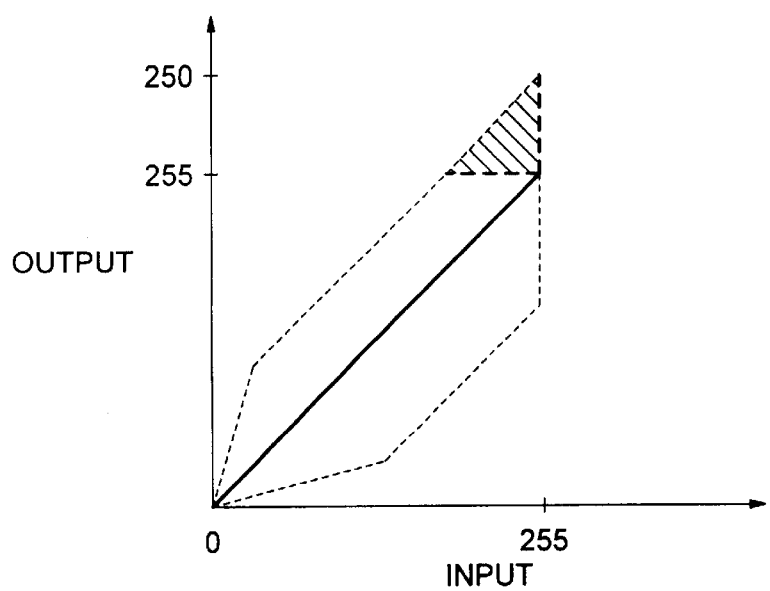
FIG. 33 is a diagram for indicating a structural example of an image data correcting means employed in the optical printing apparatus according to the embodiment mode 6 of the present invention.
FIG. 34 is a graphic diagram for indicating a correcting method of the image data correcting means employed in the optical print apparatus according to the embodiment mode 6 of the present invention.

Next, both the fluctuation data and the image data are entered into the fluctuation data converting means 11. In the fluctuation data converting means 11, the entered image data is corrected so as to be converted into proper image data. As a result, proper image data may be outputted from this fluctuation data converting means 11, as represented in FIG. 33. In this case, a specific attention should be paid to such a fact that the value of the image data is increased. This fact is caused by the following reason. That is, in order to firmly obtain the gradation characteristic (in this case, 256 gradation is firmly obtained), the corrected value of the image data is made larger than the input value of this image data.

Then, the output (reference level) derived from the reference level producing means 3 and the output from the image data correcting means 2 are compared with each other by the comparing means 4, (so that data for print head 8 is produced), and then, the print head 8 is driven by the data transferring means 5, the latch control means 6, and the strobe control means 7.

As previously explained in detail, in accordance with the optical printing apparatus of this embodiment mode 6, such a high image quality recording operation can be carried out, while correcting also the density variations due to the difference in the exposure positions along the main scanning direction.

Also, in this embodiment mode 6, various modifications, changes, and combinations may be achieved as explained in the above-described embodiment modes 1 to 5. For example, the setting condition such that the corrected value of the image data is made larger than the input value of the image data may be similarly applied to the embodiment mode 1.

FIG. 34 graphically shows a correcting method executed in the image data correcting means 2. In this drawing, an abscissa represents input data to the image data correcting means 2, and an ordinate shows output data corrected by this image data correcting means 2.

A difference of the correcting methods between FIG. 34 and FIG. 2 is featured by that the value of the corrected output data is made larger than the value of the input image data. As a result, the data correction can be made even in a hatched portion shown in FIG. 34, namely, the region where the data correction cannot be carried out in the conventional correcting method, so that it is possible to form the image having a higher image quality. A decision to what extent the output result of the image data correcting means 2 is made larger than the dynamic range of the input data to the image data correcting means 2 varies, depending upon the fluctuation degrees in the LCD shutter elements 23 and the recording density characteristics thereof. There is no specific limitation in this degree.

Embodiment Mode 7

Figure 35:
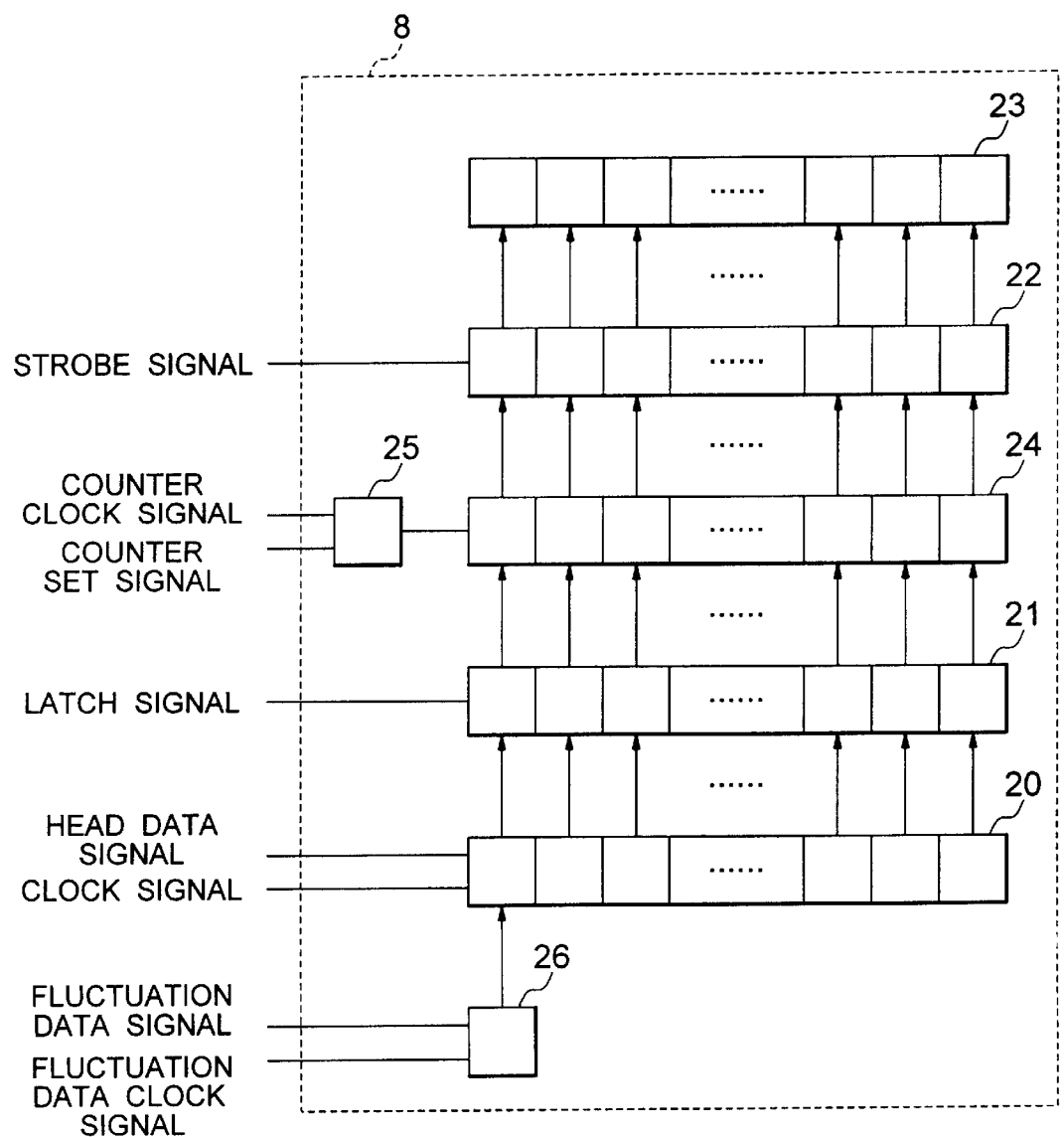
FIG. 35 illustratively indicates a structure of a print head provided in an optical printing apparatus according to an embodiment mode 7 of the present invention.

Referring now to drawings, an optical printing apparatus according to an embodiment mode 7 of the present invention will be described. FIG. 35 illustratively indicates a structure of a print head provided in the optical printing apparatus according to the embodiment mode 7 of the present invention.

This embodiment mode 7 is accomplished by directly transferring the output of the image data correcting means 2 to the print head 8 as head data. In other words, the reference level producing means 3 and the comparing means 4 shown in FIG. 1 are eliminated. Further, as illustrated in FIG. 35, head data comparing means 24 and count means 25 are added to the structure of the print head 8 shown in FIG. 6, and the print head 8 contains therein fluctuation data storage means 26.

The head data comparing means 24 and the count means 25 are added in this embodiment mode 7 because the data transfer number within a line is remarkably reduced, realizing a high speed operation. The fluctuation data storage means 26 is contained in the print head 8 in this embodiment mode 7 because a reliable combination of the print head 8 and the fluctuation data realizes a high quality recording operation at low costs. A difference between the foregoing embodiment mode 1 illustrated in FIGS. 1 and 6 and this embodiment mode 7 will be in that the reference level producing means 3 and the comparing means 4 are replaced by the count means 25 and the data comparing means 24, respectively.

A description will now be made of the operation of the optical printing apparatus according to the embodiment mode 7 with reference to FIGS. 1 and 35. In FIGS. 1 and 35, the image data inputted into the image data input means 1 is corrected for fluctuations in the print head 8 and the like by the image data correcting means 2. The fluctuation data as used herein can be obtained by inputting a fluctuation data clock signal generated by control means (not shown) into the fluctuation data storage means 26.

In other words, the fluctuation data storage means 26 contains therein the fluctuation data corresponding to the elements within the print head 8, which can be then read out sequentially by generating the fluctuation data clock signal. The read fluctuation data is then used in the image data correcting means 2. It should be noted that a method of simply multiplying the ratio of the fluctuation data to a minimum value thereof by the image data may be employed in addition to the aforementioned method based on the correction coefficient to operate the image data correcting means 2, but the present invention is not to be limited thereto in particular. Then, the output of the image data correcting means 2 are inputted into the data transferring means 5, and the print head 8 is driven by the latch control means 6 and the strobe control means 7.

A description will now be made of a specific method of driving the print head 8. The data transferring means 5 is synchronism with clock signal (not shown) to output corrected image data (the head data signal) to the print head 8.

More specifically, the data transferring means 5 outputs the data to the shift register 20 shown in FIG. 35. The shift register 20 as used herein is a shift register not for binary data but for multi-value data. In response to an instruction issued from the control means (not shown), the latch control means 6 outputs a latch signal. This instruction implies that the transfer operation of the data in one line has been completed.

Then, in response to a counter set signal issued from the control means (not shown), the count means 25 is set to a predetermined value (for example, zero), and the counter clock signal is sequentially supplied (so that the above-described reference level producing means 3 can be incremented) to count up the count means 5.

The head data comparing means 24 compares the output of the count means 25 with the output of the latch 21, sending "1" while the output of the count means 25 is smaller than the output of the latch 21 and sending "0" while the output of the count means 25 is the output value of the latch 21 or larger.

Then, inside the print head 8, the strobe control means 7 enables the strobe signal. Then, the output of the head data comparing means 24 and the strobe signal allow the LCD shutter element 23 to be selectively driven at a desirable voltage, so that the data recording operation on the first line is carried out. Furthermore, a similar data recording apparatus is repeatedly in the unit of 1 line, so that an image forming operation for 1 screen can be accomplished.

As previously described, in accordance with this embodiment mode 7, there are such effects that since a high speed recording operation can be realized and a reliable combination of the print head 8 with the fluctuation data can realize a high quality recording operation at low costs.

It should be understood that various modifications and changes as described in the embodiment modes 1 to 6 may also be made in this embodiment mode 7. For example, while the LCD shutter element has been described, light emitting elements such as ELs or LEDs may be used in the same manner.

In addition, the fluctuation data storage means 26 may be contained in the print head 8 shown in FIG. 6, or may be eliminated from the structure of the print head 8 shown in FIG. 35.

The strobe signal shown in FIG. 35 may also be eliminated. In this case, the driver 22 may drive the LCD switching element 23 only in response to the output of the head data comparing means 24.

A further modification may be appropriately made such that the latch 21 may be eliminated so as to input the output of the shift register 20 into the head data comparing means 24, or the output of the head data comparing means 24 is inputted into the latch 21, inputting the output of the latch 21 into the driver 22, inputting the output of the driver 22 into the LCD switching element 23.

What is claimed is:

1. An optical printing apparatus for selectively exposing a photosensitive recording medium to light emitted from a print head to thereby form a gradation image, comprising:

image data input means for inputting image data;

image data correcting means for correcting said inputted image data in such a manner that a density fluctuation of said print head is deleted;

reference level producing means for producing a reference level;

comparing means for comparing multi-value data outputted from said image data correcting means with said reference level so as to convert said multi-value data into binary data;

data transferring means for transferring said binary data outputted from said comparing means as head data to said print head;

latch control means for latching data of said print head; and strobe control means for enabling said print head to expose the light therefrom;

whereby said print head is driven in response to the output results of said data transferring means, said latch control means, and said strobe control means to thereby form the gradation image.

2. An optical printing apparatus as claimed in claim 1, wherein said latch control means outputs a latch signal, the intervals of which are substantially constant within a recording time period of 1 line.

3. An optical printing apparatus as claimed in claim 2, wherein the intervals of said latch signal, or the strobe width of a strobe signal is controlled based upon temperature detection information.

4. An optical printing apparatus as claimed in claim 1, wherein said latch control means outputs a latch signal whose interval ratio is substantially equal to 1:2:4:8, - - -, within a recording time period of 1 line.

5. An optical printing apparatus as claimed in claim 4, wherein the intervals of said latch signal, or the strobe width of a strobe signal is controlled based upon temperature detection information.

6. An optical printing apparatus as claimed in claim 1, wherein said strobe control means outputs a strobe signal having a strobe width fitted to a recording characteristic.

7. An optical printing apparatus as claimed in claim 6, wherein intervals of a latch signal, or the strobe width of a strobe signal is controlled based upon temperature detection information.

8. An optical printing apparatus as claimed in claim 1, wherein said optical printing apparatus is further comprised of:

accumulated drive time storage means for storing drive time of said print head in an accumulation manner, and wherein a density variation of said print head is corrected based on accumulated drive time.

9. An optical printing apparatus as claimed in claim 1, wherein said image data correcting means corrects a density variation of said print head, which is due to a difference in exposure positions along a main scanning direction.

10. An optical printing apparatus as claimed in claim 1, wherein said image data correcting means outputs output data larger than a dynamic range of input data.

11. An optical printing apparatus as claimed in claim 1, wherein the fluctuation data of said image data correcting means is contained in said print head.

12. An optical printing apparatus as claimed in claim 1, wherein said optical printing apparatus further comprises:

image data storing means for storing a preselected capacity of corrected image data in order to shorten a data transfer time between an external host computer and the optical printing apparatus.

13. An optical printing as claimed in claim 1, wherein said optical printing apparatus further comprises:

image data storing means for storing a preselected capacity of image data in order to shorten a data transfer time between an external host computer and the optical printing apparatus.

14. An optical printing apparatus as claimed in claim 1, wherein said optical printing apparatus further comprises:

image data converting means for converting the image data into exposure levels.

15. An optical printing apparatus as claimed in claim 1, wherein said optical printing apparatus further comprises:

accumulated drive time storage means for accumulating data values to be inputted into the image data correcting means wherein an aging change is corrected.

16. An optical printing apparatus for selectively exposing light emitted from a print head onto a photosensitive recording medium to thereby form a gradation image, comprising:

image data input means for inputting image data;

image data correcting means for correcting said inputted image data in such a manner that a density fluctuation of said print head is deleted;

data transferring means for transferring the data outputted from said image correcting means as head data to said print head; and head data comparing means for comparing the head data with each other in said print head;

whereby said print head is driven in response to the output results of said data transferring means and said head data comparing means to thereby form the image.

17. An optical printing apparatus as claimed in claim 16, wherein the fluctuation data of said image data correcting means is contained in said print head.

* * * * *